(12) United States Patent
Kaul

(10) Patent No.: US 6,408,880 B1
(45) Date of Patent: Jun. 25, 2002

(54) PLUG-IN COUPLING FOR CONNECTING PIPELINES, HOSES OR SIMILAR

(75) Inventor: Wolfgang Kaul, Wuppertal (DE)

(73) Assignee: Carl Kurt Walther GmbH & Co. KG, Haan (DE)

( * ) Notice: Subject to any disclaimer, the term of this patent is extended or adjusted under 35 U.S.C. 154(b) by 0 days.

(21) Appl. No.: 09/700,255

(22) PCT Filed: Mar. 10, 2000

(86) PCT No.: PCT/EP00/02113

§ 371 (c)(1),
(2), (4) Date: Jan. 12, 2001

(87) PCT Pub. No.: WO00/55537

PCT Pub. Date: Sep. 21, 2000

(30) Foreign Application Priority Data

Mar. 13, 1999 (DE) .......................................... 199 11 208

(51) Int. Cl.$^7$ ............................................... F16L 29/00
(52) U.S. Cl. ............................... 137/614.06; 137/614.05
(58) Field of Search ....................... 137/614.06, 614.05, 137/614; 251/149.9

(56) References Cited

U.S. PATENT DOCUMENTS

| 2,773,706 A | | 12/1956 | Leavell | |
|---|---|---|---|---|
| 2,836,207 A | | 5/1958 | Griswold | |
| 3,301,272 A | * | 1/1967 | Pettyjohn et al. | ...... 137/614.06 |
| 5,095,947 A | * | 3/1992 | Weh et al. | ........... 251/149.9 X |
| 6,035,894 A | * | 3/2000 | Weh et al. | ............. 137/614.06 |
| 6,202,692 B1 | * | 3/2001 | Schumacher | ........... 137/614.06 |

FOREIGN PATENT DOCUMENTS

| DE | 19724120 | 12/1998 |
|---|---|---|
| EP | 0278420 | 8/1988 |
| EP | 0773395 | 5/1997 |

* cited by examiner

Primary Examiner—Kevin Lee
(74) Attorney, Agent, or Firm—Martin A. Farber

(57) ABSTRACT

A plug-in coupling (K) for connecting pipelines, tubes or the like, having a valve body (2) which is disposed in one of the two coupling parts (I, II) and can be actuated from the outside, in particular by a hand lever (1), and having a locking sleeve (9) which can be displaced from a locking position, in which the plugged-together position of the two coupling parts (I, II) is secured by spring loading, into a release position, and having a further valve body (7), which is disposed in the other coupling part (II), and, in order to achieve an operationally favorable/reliability solution, the invention proposes in the plugged-together position, the one valve body (2) brings about primarily opening of the other valve body (7) at the periphery.

89 Claims, 14 Drawing Sheets

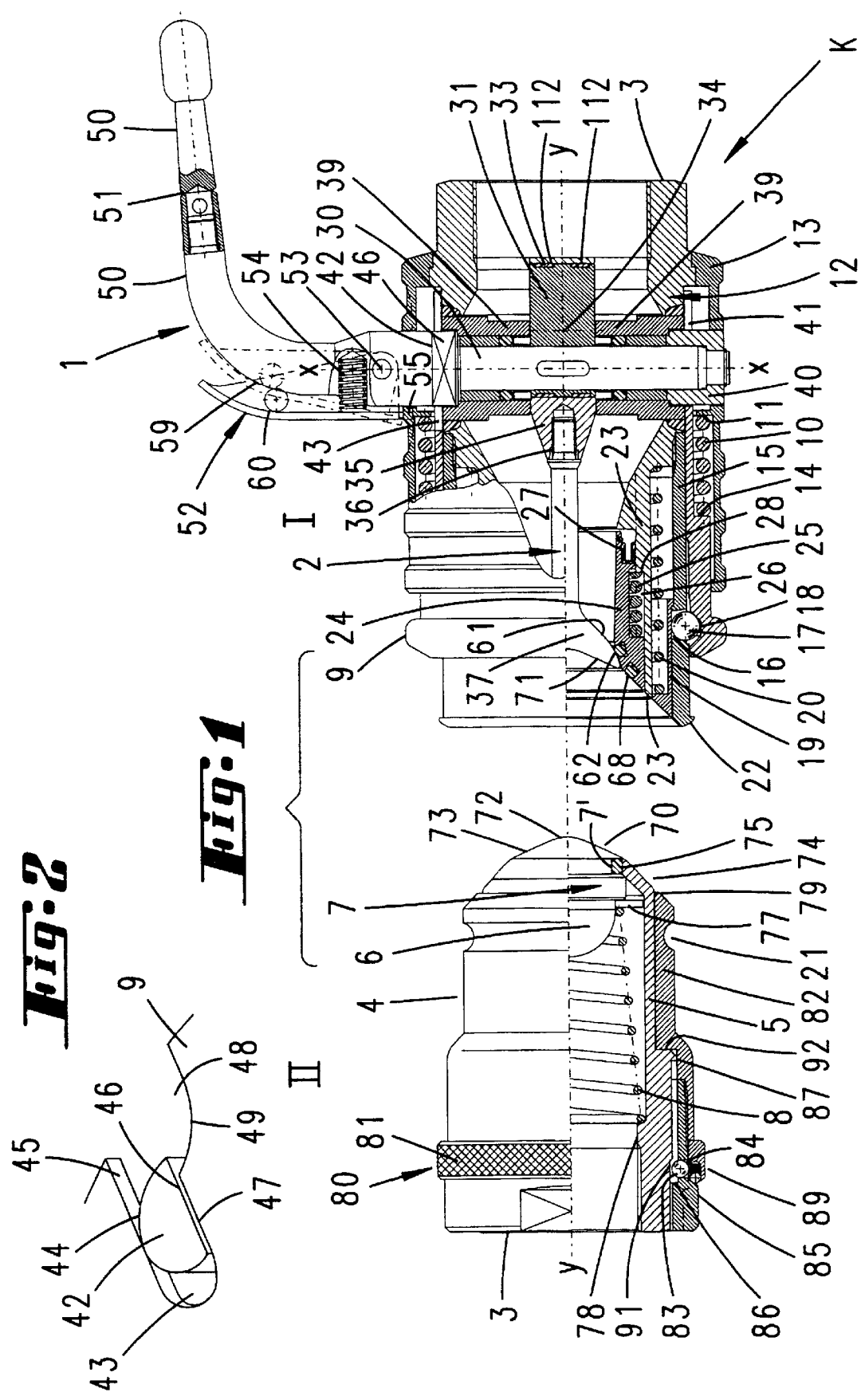

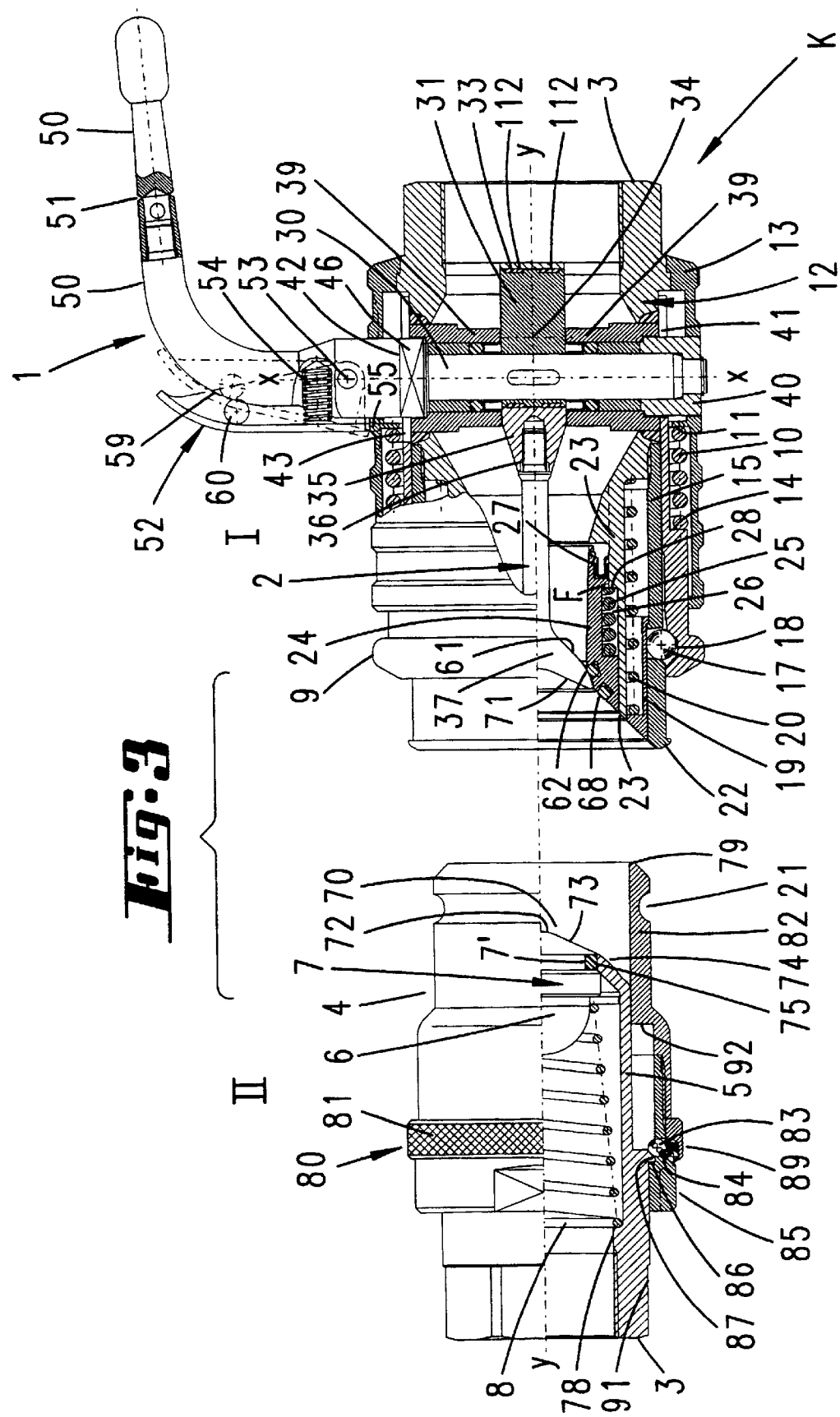

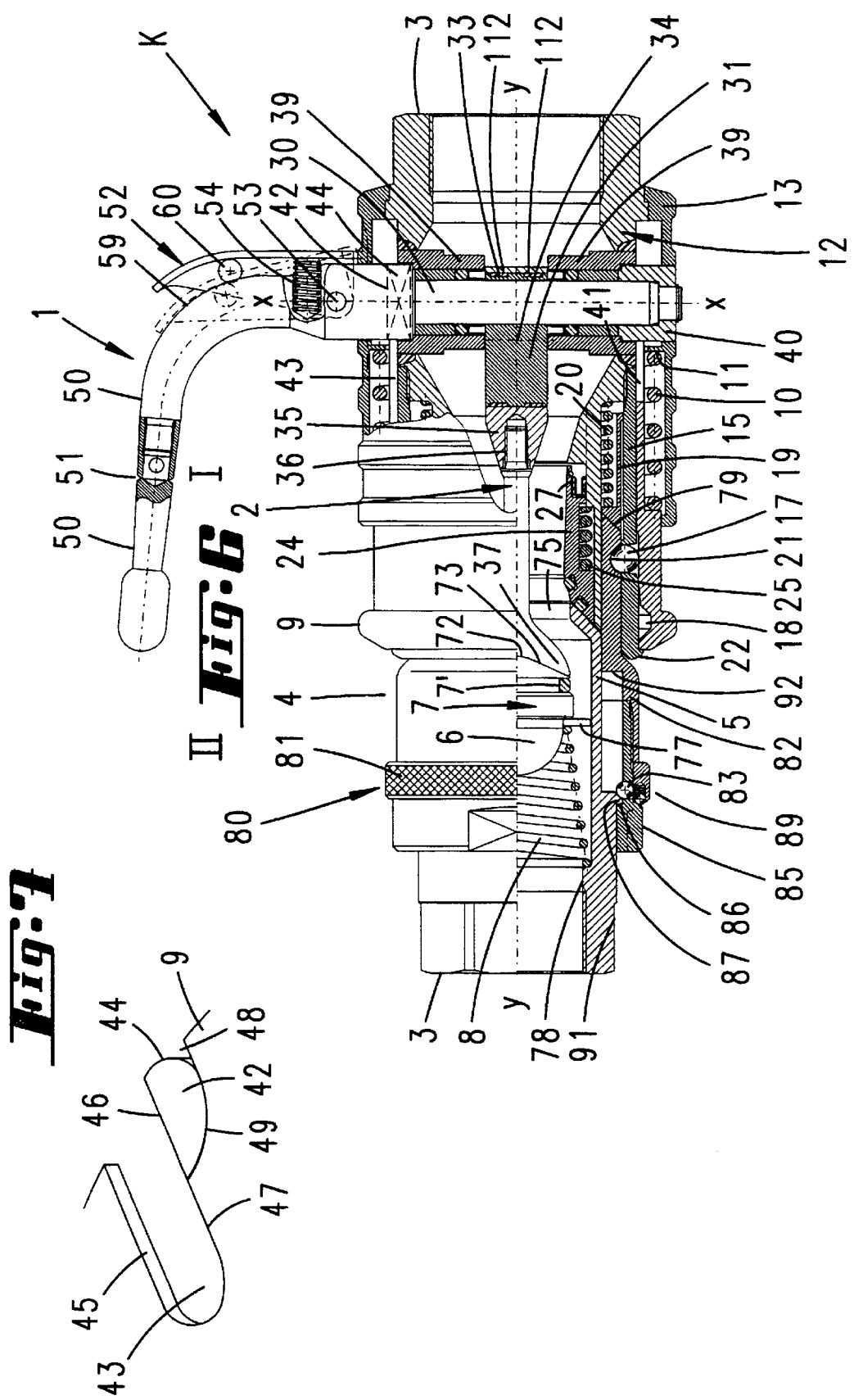

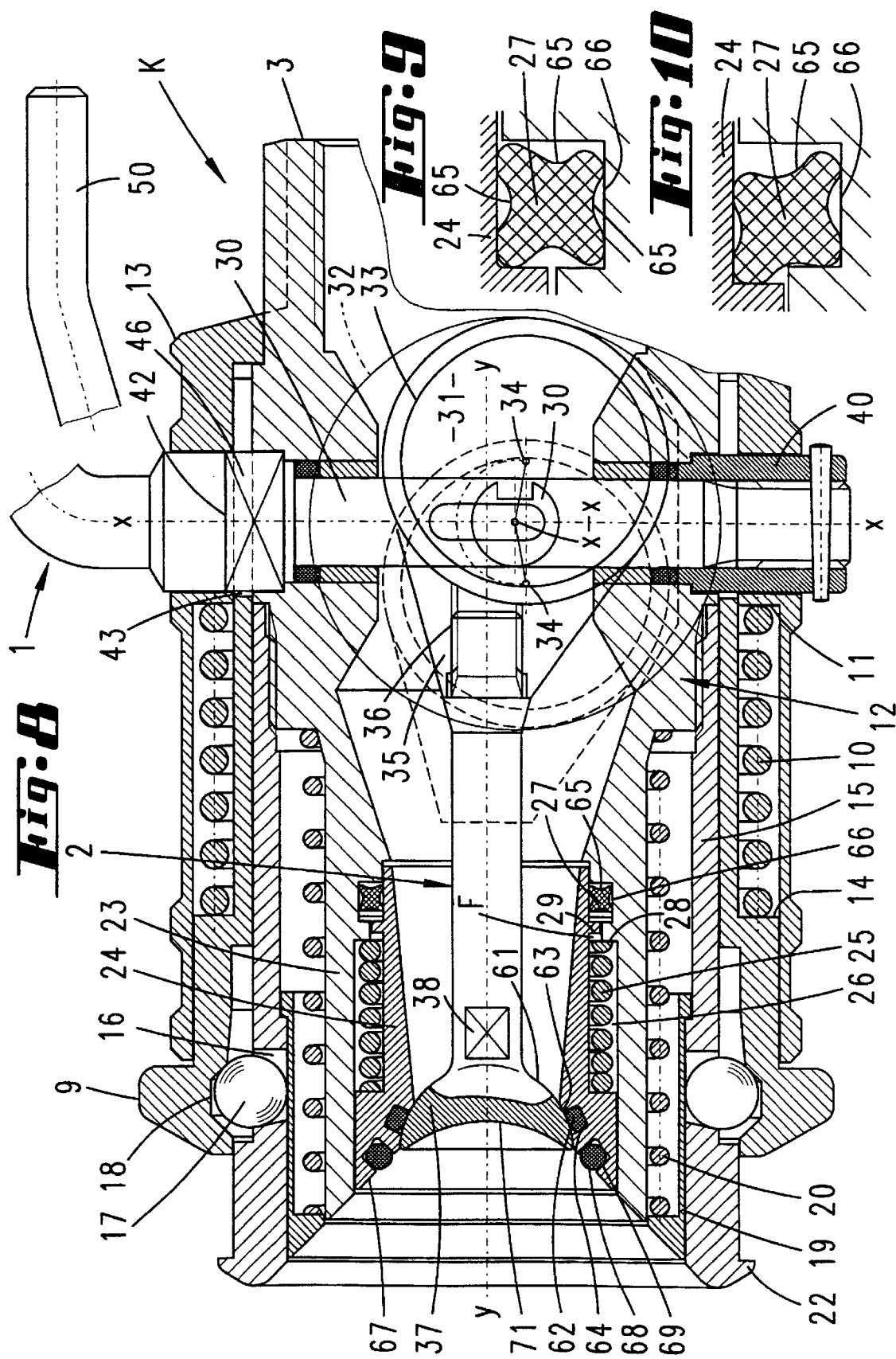

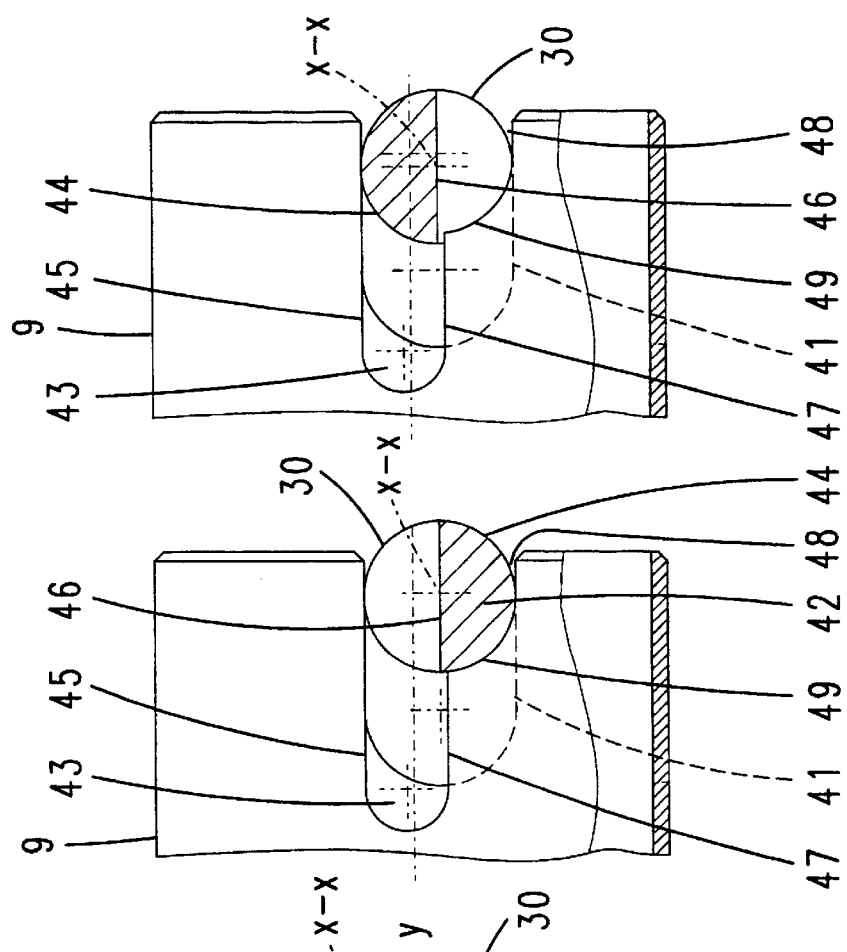

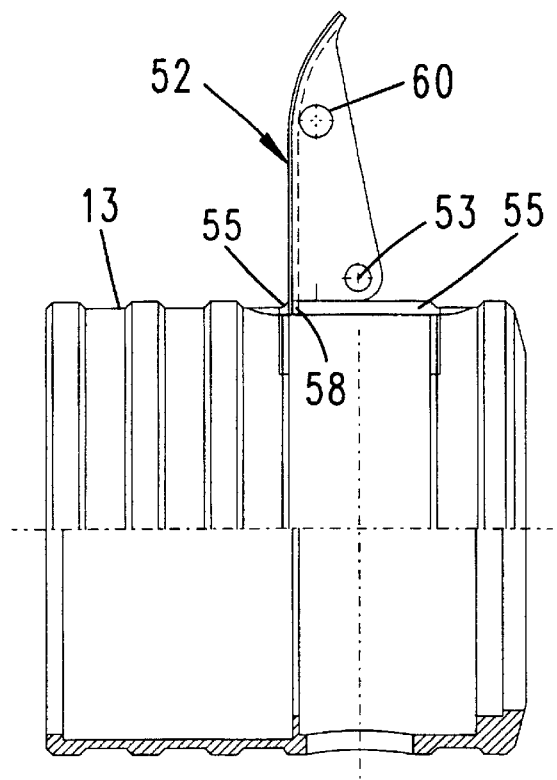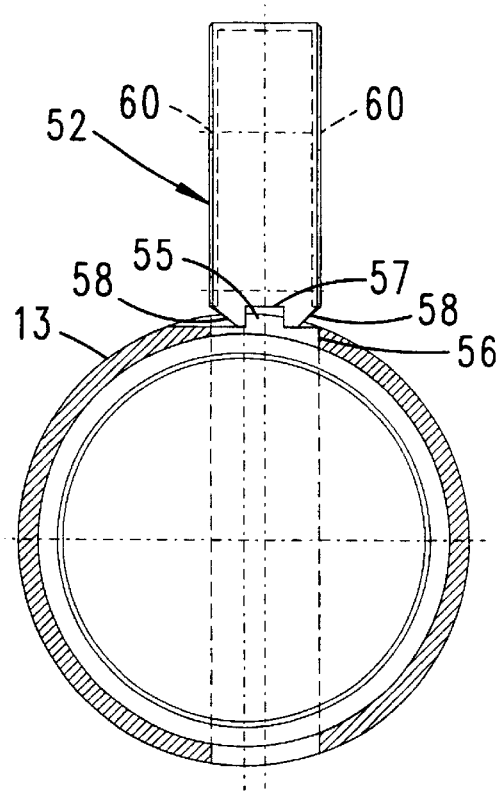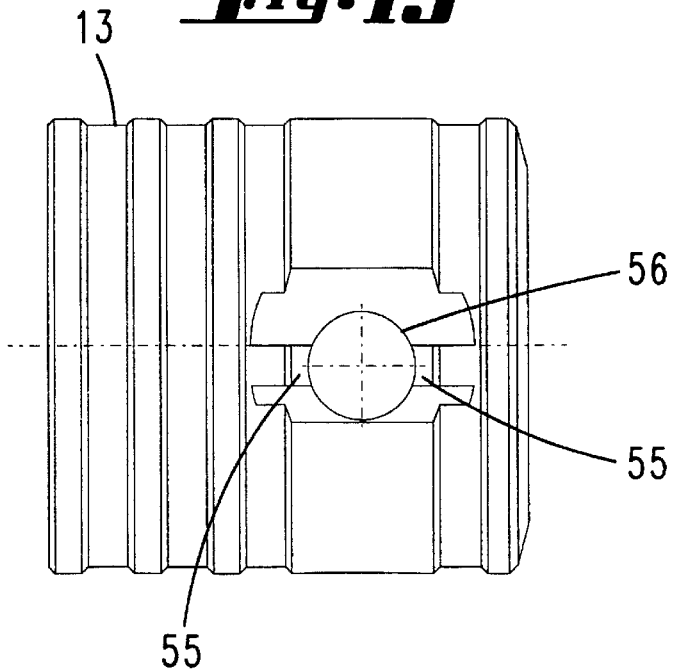

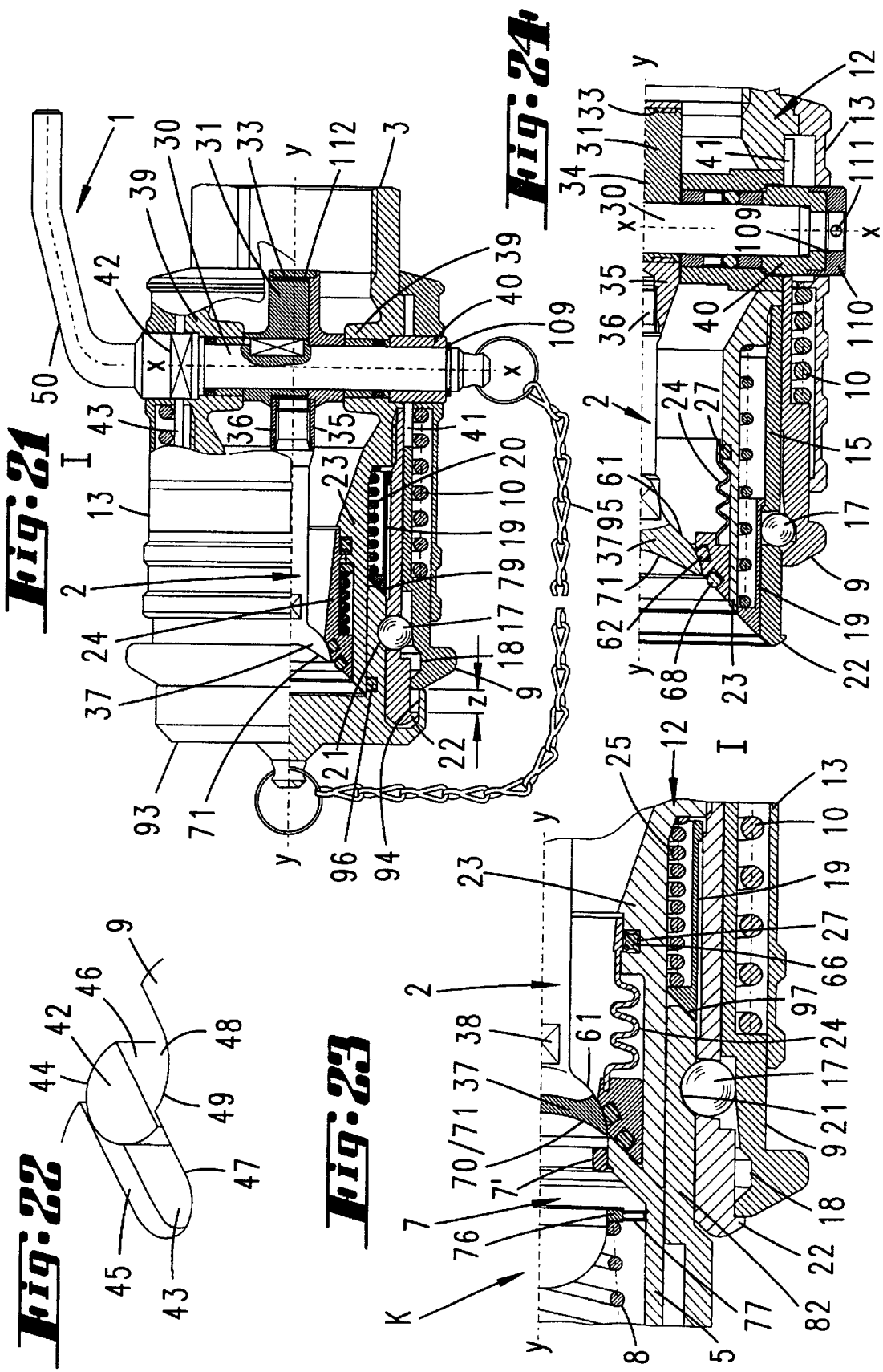

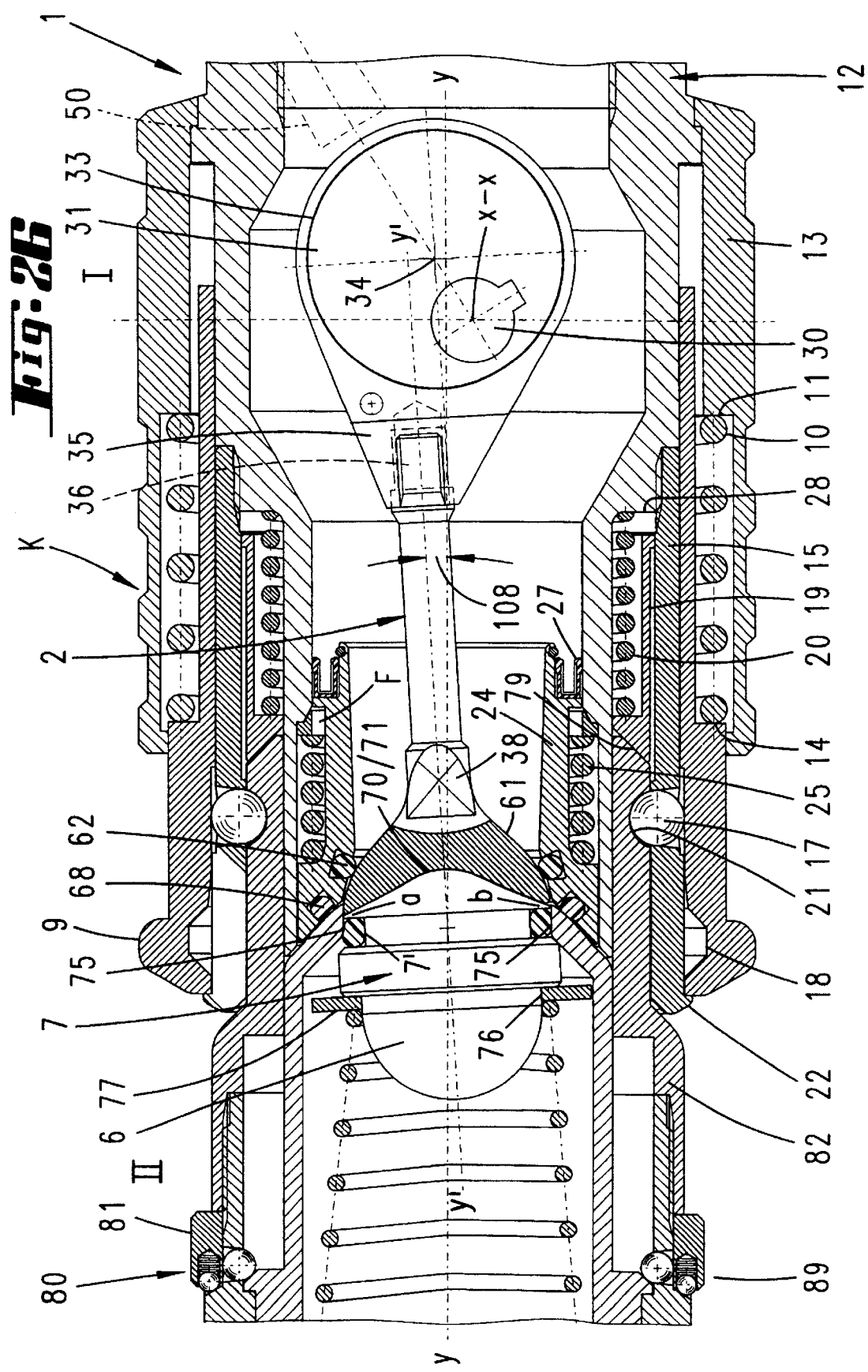

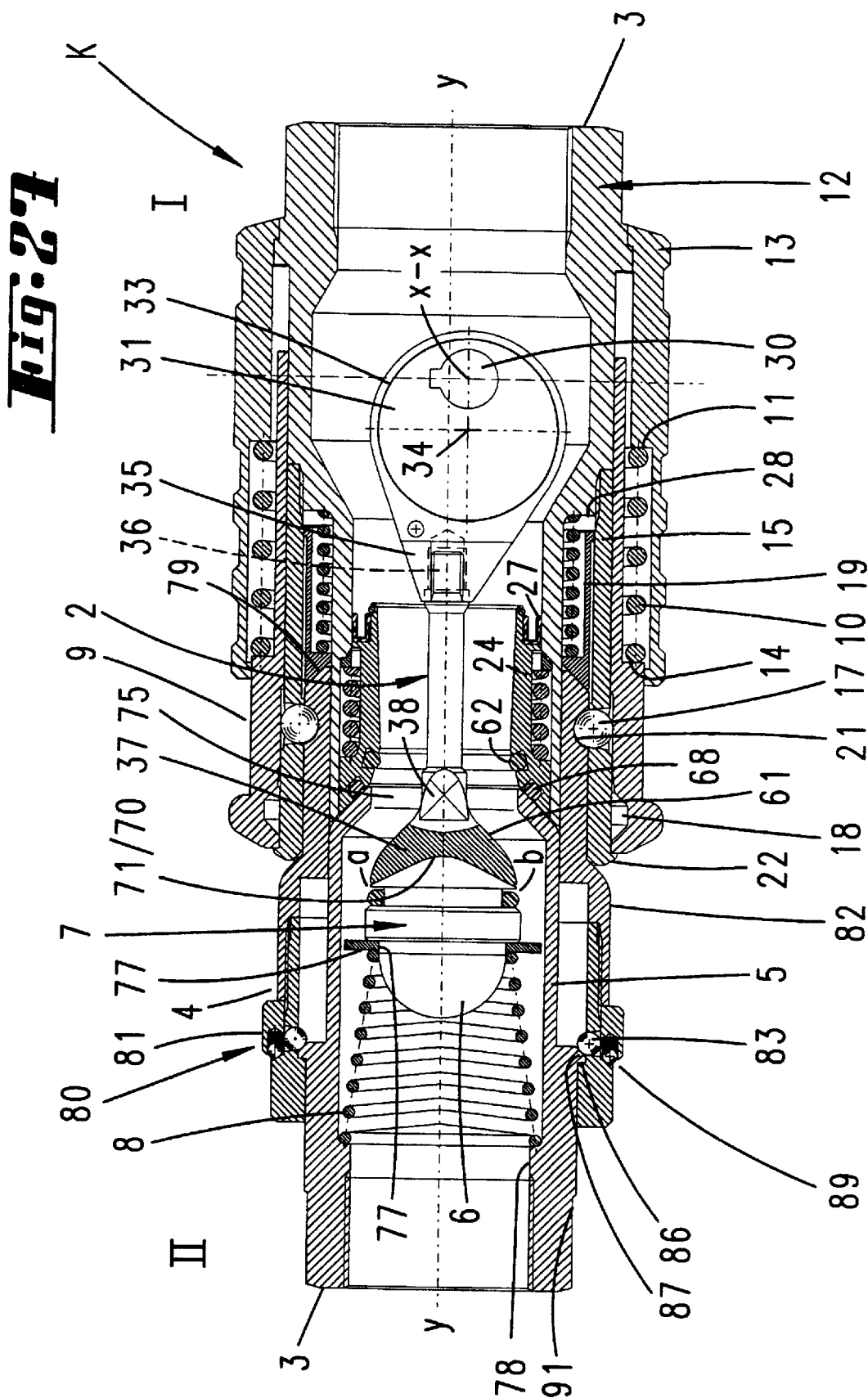

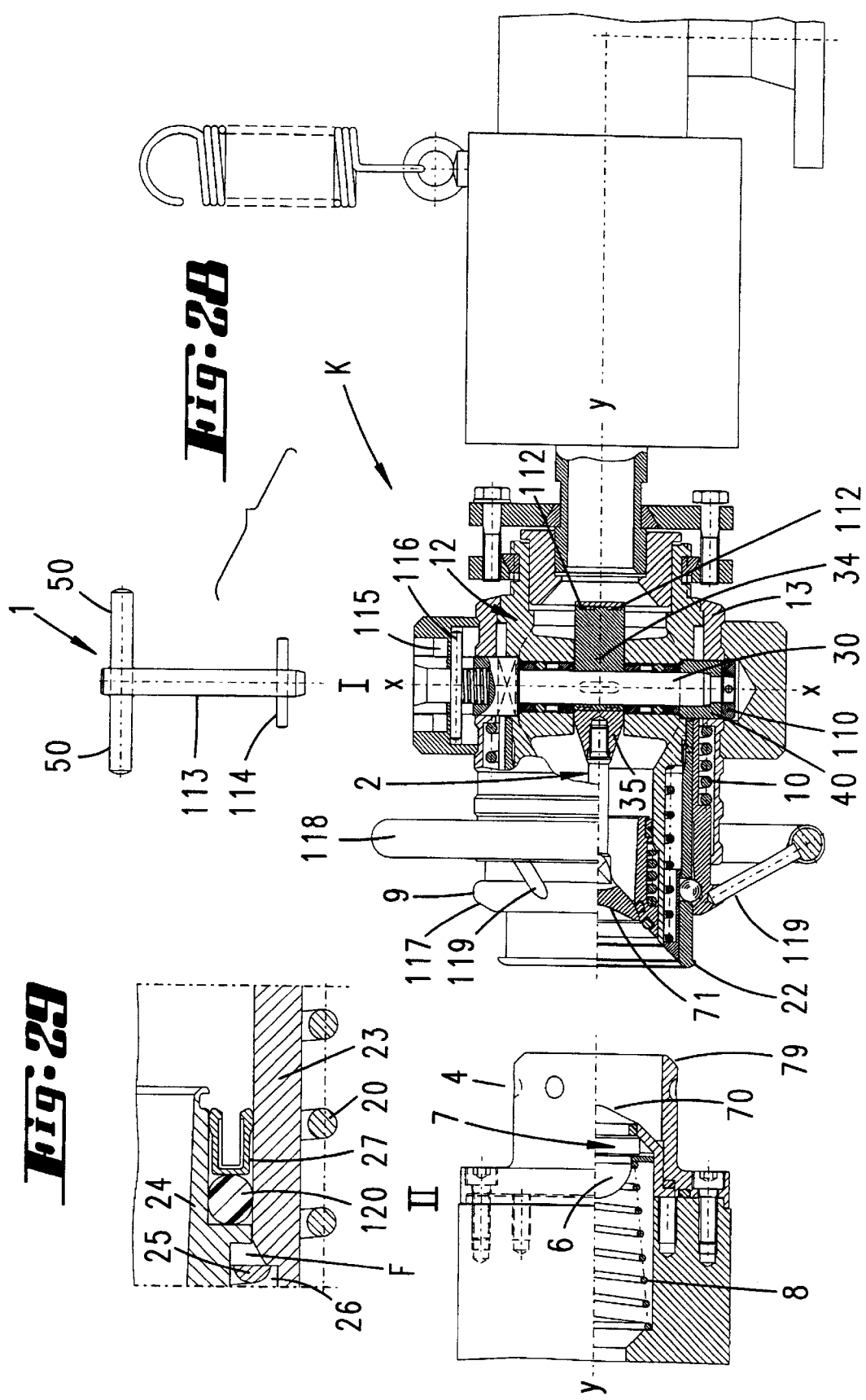

PLUG-IN COUPLING FOR CONNECTING PIPELINES, HOSES OR SIMILAR

FIELD AND BACKGROUND OF THE INVENTION

The invention relates to a plug-in coupling for connecting pipelines, tubes or the like, having a valve body which is disposed in one of the two coupling parts and can be actuated from the outside, in particular by a hand lever, and having a locking sleeve which can be displaced from a locking position, in which the plugged-together position of the two coupling parts is secured by spring loading, into a release position, and having a further valve body, which is disposed in the other coupling part.

It is an object of the invention to provide a plug-in coupling of the above-mentioned type in an operationally reliable and easy-to-operate manner.

This object is achieved in the case of a plug-in coupling having the above-mentioned features it being provided that, in the plugged-together position, the one valve body brings about primarily opening of the other valve body at the periphery. A pressure-neutral coupling is thus provided even in the case of high media pressures, actuation correspondingly requiring only moderate forces. The valve body which releases the flow path is not displaced primarily in the axial direction, but rather is raised with tilting action. Even just small tilting angles are sufficient here. All of this also takes place in a sealed situation, with the result that it is possible to operate with minimal leakage. In this respect, excellent operational reliability is provided.

Taking the safety aspect into consideration, the invention also proposes observing a corresponding actuating sequence. This is embodied in a plug-in coupling wherein the external actuation of the valve body in a release position of the locking sleeve, which is retained there despite the spring loading, and displacement of said locking sleeve into the release position in an open position of the valve body are blocked. In this way, a plug-in coupling with a high safety value is achieved. The valve body can only be opened in the coupled position of the coupling parts. In contrast, decoupling can only be carried out when the valve body is located in the closed position. The hand lever cannot be actuated as long as the locking sleeve is located in a release position. Conversely, the locking sleeve cannot be brought out of its locking position if the hand lever is not in the definitive blocking position. Such a rigid progression in conjunction with the hand-lever-actuatable plug-in coupling means that the latter can be used for problematic areas, such as chemistry and pharmaceuticals. It thus also proves advantageous for the two blocking positions to be associated with the end regions of the displacement of the locking sleeve and external actuation. It is only at the very last moment that the respective function is activated. This presupposes that the actuating travel is complete in each case. It is the case therefore that no overall volume compression is present. The locking takes place first of all, and then the valves are opened. It is further provided for the external actuation to take place by means of a rotary actuation which is converted into a longitudinal displacement of the valve body. The drive in this respect requires only a small number of parts, and is reliable, if it is further provided such that the rotary-actuation axis has an eccentric on which the valve body is articulated via connecting-rod bearings, forming an anchoring point. In order to facilitate the valve body in finding its valve seat of its own accord in practice, the invention proposes that, in a position in which it has been displaced in an opening direction, the valve body is mounted such that it can be pivoted about its anchoring point on the rotary-actuation axis. An advantageous embodiment of the rotary-actuation axis as far as the activation-related interaction with the locking sleeve is concerned is achieved by the rotary-actuation axis carrying a semicircularly-shaped locking protrusion which is located concentrically with the axis and with which a guide slot of the locking sleeve is associated, such that, in a release position of the locking sleeve, the semicircular profile of the locking protrusion enters into the guide slot with engagement on both sides and, in a release position of the locking sleeve, the arcuate surface of said semicircular profile, entering into a free space, moves into the guide slot, in front of a blocking flank of the guide slot, to the side of the guide slot. The blocking and release operations of the rotary-actuation axis are thus clearly separate. An advantageous feature then resides in the fact that the locking sleeve itself is secured against rotation by the rotary-actuation axis. This also provides high-grade functional reliability of the plug-in coupling. Provision is also made for the rotary-actuation axis to continue into a preferably removable hand-lever grip. With a fixedly associated hand-lever grip, safety is aided here by the hand-lever grip having a predetermined breaking point. The safety idea is further embodied by the hand-lever grip being provided with a catch. In using the catch movement, an advantageous embodiment resides in the fact that the actuation path of the catch can be blocked via a lead-seal device. It is possible to achieve long service lives for the sealing bodies by the plug-in end of the valve body being drawn against a seat seal by way of a curved rear side. In this case, the sealing seat is facilitated by the seat seal being disposed in a sliding sleeve which is spring-loaded in a sealing direction. The sealing engagement of said sliding sleeve may also be assisted by the media pressure. Access is taken into account for this purpose. A measure which avoids friction and thus premature wear at the same time is also achieved in that, at its end which is directed away from the sealing seat, an annular seal is associated with the sliding sleeve, which seal, being in positive engagement with the sliding sleeve and the coupling-part housing, compensates for the movement of the sliding sleeve by itself deforming. It is further provided for the sliding sleeve to engage against the rear side of the valve body. Moreover, it is favorable if, on its plug-in-side head surface, the sliding sleeve carries a second seat seal for interaction with the head surface of the other coupling part, that is to say the plug-in nipple.

A development of this provides for the head surface of the plug-in-nipple coupling part to be curved to match a correspondingly curved recess of the valve body of the coupling. In this case, a shaping has proven advantageous to the effect that the curved configuration of the head surface is made up of a central ball portion with an adjoining shallow truncated cone. This has excellent centering action in respect of the pivotable mounting of the valve body. It is also taken into account that, in a plugged-in position, the curved head surface is located at a small spacing from the seat seal of the sliding sleeve associated with it. This allows mechanical coupling without loading of the head surface. On the other hand, however, the spacing is small enough to prevent any dead space remaining in which medium could accumulate to any appreciable extent. It is also favorable, during its opening displacement, for the valve body to push the head surface back in relation to the encircling front surface of the plug-in nipple, with opening for throughflow of media being effected as a result of the valve body moving into an opening of the front surface of the plug-in nipple. This takes place without great force being applied. Furthermore, a solution which is even important in its own right consists in that the front surface in the sleeve-like housing of the plug-in-nipple coupling part, following an unlocking operation, can be displaced beyond the plug-in-side front wall of the plug-in-nipple housing. This allows easy access for cleaning. For forward and rearward displacement in this respect, provision is made for the locking and unlocking to take place by means of an actuating ring which is disposed on the sleeve-like housing of the plug-in-nipple coupling part in a rotatable manner and to the rear of an annular groove, into which the blocking balls, controlled by the locking sleeve, enter. This allows the head surface to be drawn in again extremely easily, i.e. displaced back into a protected position within the housing of the plug-in-nipple coupling part. It is only in this position, which ensures sufficient plug-in guidance for the coupling, that the valve body of the plug-in nipple can be opened. The forward displacement of the head surface beyond the encircling front surface allows not just the easy cleaning of the plug-in nipple; it also allows the state of the same to be checked. It is further provided for the curved head surface to be seated on a resiliently mounted load-bearing part which can be displaced, with circumferential guidance, in the housing of the plug-in-nipple coupling part.

An advantageous configuration is also achieved by a dummy stopper which is associated with the plug-in-nipple coupling part and has a sleeve wall engaging over it in a cup-like manner, a seat seal of the dummy stopper engaging against the encircling front surface and the dummy stopper being provided with retaining balls which can be directed into the annular groove of the housing by screw-action displacement of the cup sleeve wall in relation to an inner sleeve. This solution embodies advantageous securing for transportation with simultaneous protective covering of the load-bearing part, which is always located in a somewhat exposed position. In order that the arrangement can be easily secured for transportation, providing a sufficiently pressure-tight protective cap in the direction of the plug-in nipple, provision is made for the cup sleeve wall and inner sleeve to be provided with gripping ribs.

A further advantageous measure is provided by a closure stopper which is retained by the blocking balls, is similar to a plug-in nipple and blocks the locking sleeve against further displacement shortly before said locking sleeve reaches its securing end position, that is to say the plugged-together position. This is an advantage from the solution where the blocking positions are only achieved at the last moment. The construction is then characterized by a stop-limited clearance between the sliding sleeve and the guiding housing of the same in the region of a spring chamber, which is a constituent part of the two parts and accommodates a prestressed sliding-sleeve spring. This is achieved structurally by simple means in that, in a supported position of the valve body, the sliding-sleeve spring is supported on an annular shoulder of the housing, another annular shoulder of the sliding sleeve trailing in relation to the same to provide a clearance. It is also proposed that, directed away from the coupling joint, the sliding sleeve has a flexible corrugated-tube portion which interacts with the annular seal. This functions, at the same time, as the sliding-sleeve spring.

Taking up the idea of the primarily occurring peripheral opening of the other valve body, it is proposed that the other valve body can be displaced both with tilting movement and also axially in the other coupling part. The tilting movement can be achieved by corresponding shaping of the contact surfaces of the valve bodies. Furthermore, the other valve body is mounted by being supported by means of a helical spring. This brings with it from the movement point of view, the, so to speak, floating movement of said valve body to good effect. The helical spring is preferably a conical helical spring. It is also proposed that the valve body be accommodated in a cylindrical valve seat with which, on the valve-seat side, a radial seal is associated. The tilting can also be brought about, however, utilizing the above-explained drive means of the rotary-actuation axis, which displaces one valve body as initiator in the coupling. This makes it possible to achieve the situation where the axis of the one valve body, at the beginning of the opening movement, moves into a tilted position which does not coincide with the longitudinal center axis of the coupling, said axes finally being oriented in coaxial alignment. The connecting-rod drive is thus utilized here to very good effect. Accordingly, the valve body, when in aligned orientation with the longitudinal center axis of the coupling, has a closure edge running perpendicularly to the longitudinal center axis. The opening path, which begins with a minimal, approximately half-moon-shaped initial slit, finally increases into a rotationally symmetrical equal-width annular gap for the medium.

A further measure for achieving the sought-after operational reliability consists in the shaft being secured beneath an end bushing by a retaining ring, and in that the retaining ring, for its part, is secured by a securing bushing engaging radially over it. In order that the securing bushing, which may optionally be screw-connected, remains retained in non-releasable manner, it is proposed that the securing bushing itself be secured on the shaft by a split pin.

In order to maintain disruption-free actuation of the control device, it is proposed that the connecting-rod bearing has a plastics-material sliding element. This may be a lining ring, with the result that the sliding element is of ring-like formation all the way round.

The sliding element is provided in pairs. A low-wear solution is preferred as far as the sliding elements are concerned, for which purpose said elements are formed from fiber-reinforced Teflon.

The invention then proposes that the removable hand-lever grip has a wrench head which can be connected to a socket portion for driving the shaft in rotation. A hand lever configured in this way can be stored, following the activation of the coupling, in various places, if appropriate so as to ensure authorization. It may be provided to be of a size such as to allow easy actuation; following removal, on the other hand, it does not get in the way. In terms of rotation, the full 180° are also utilized here for the activation of the connecting-rod mechanism. In the case of larger installations for such couplings, it is advantageous for a locking sleeve to have a freely projecting gripping ring which runs substantially transversely to the longitudinal center axis of the coupling.

As far as the seal is concerned, it is also proposed for the annular seal of the sliding sleeve to have an O-ring mounted upstream of it on the coupling-joint side. It is advantageous in this case for the downstream annular seal to be a U-ring with a U-opening in the direction of the medium. Utilizing the media pressure, it is thus possible, with the sealing bodies being subjected to extremely low mechanical stressing, to increase the sealing action. These may also be used advantageously on the shaft side.

BRIEF DESCRIPTION OF THE DRAWINGS

The subject matter of the invention is explained in more detail hereinbelow with reference to an exemplary embodiment illustrated in the drawings, in which FIG. 1 shows the plug-in coupling with the coupling parts located in a cleaning position, partially broken away, FIG. 2 shows, in perspective enlargement, the position of the locking protrusion, FIG. 3 shows the plug-in coupling in a ready-for-coupling position, FIG. 6 shows the plug-in coupling with medium throughflow released, FIG. 7 shows the enlarged position of the locking protrusion in this position, FIG. 8 shows, entirely in section and on an enlarged scale in relation to FIG. 3, the coupling part having the locking device, FIG. 9 shows, in enlargement, an annular seal in a basic position, FIG. 10 shows an identical illustration showing the annular seal under shearing deformation, FIG. 11 shows the locking sleeve in an isolated representation, illustrating the locking protrusion in the position of FIG. 2, FIG. 12 shows a portion of the locking sleeve, representing the position of the locking protrusion according to FIG. 7, FIG. 13 shows a portion of the locking sleeve, illustrating the position according to FIG. 22, FIG. 14 shows a gripping sleeve of the plug-in coupling in detailed representation, to be precise represented half in section with a catch associated in a radial plane, FIG. 15 shows the plan view thereof, without the catch, showing the latching rib interacting therewith, FIG. 16 shows a cross section through the gripping sleeve in the region of the catch, FIG. 21 shows the other coupling part with a closure stopper in the form of a covering cap, FIG. 22 shows, in perspective illustration, the position of the locking protrusion in the position according to FIG. 21, FIG. 23 shows a variant of the sliding sleeve, FIG. 24 shows, half in section, the coupling part illustrated in FIG. 23, the securing arrangement for the shaft being represented, FIG. 26 shows, on an enlarged scale in relation to FIG. 25, the plug-in coupling in a coupled position, but with connecting-rod actuation initiated, one valve body bringing about primarily opening of the other valve body at its periphery, FIG. 27 shows the plug-in coupling with throughflow released, or with the medium flowing through, and coaxially aligned multiple parts, coinciding axially with the longitudinal center axis, FIG. 28 shows a variant of the plug-in coupling with a hand lever which can be associated with the shaft in an operationally releasable manner, and FIG. 29 shows a section in the region of a sealing arrangement, using an O-ring and a downstream U-ring.

DETAILED DESCRIPTION OF THE PREFERRED EMBODIMENT

Figures 4, 5:
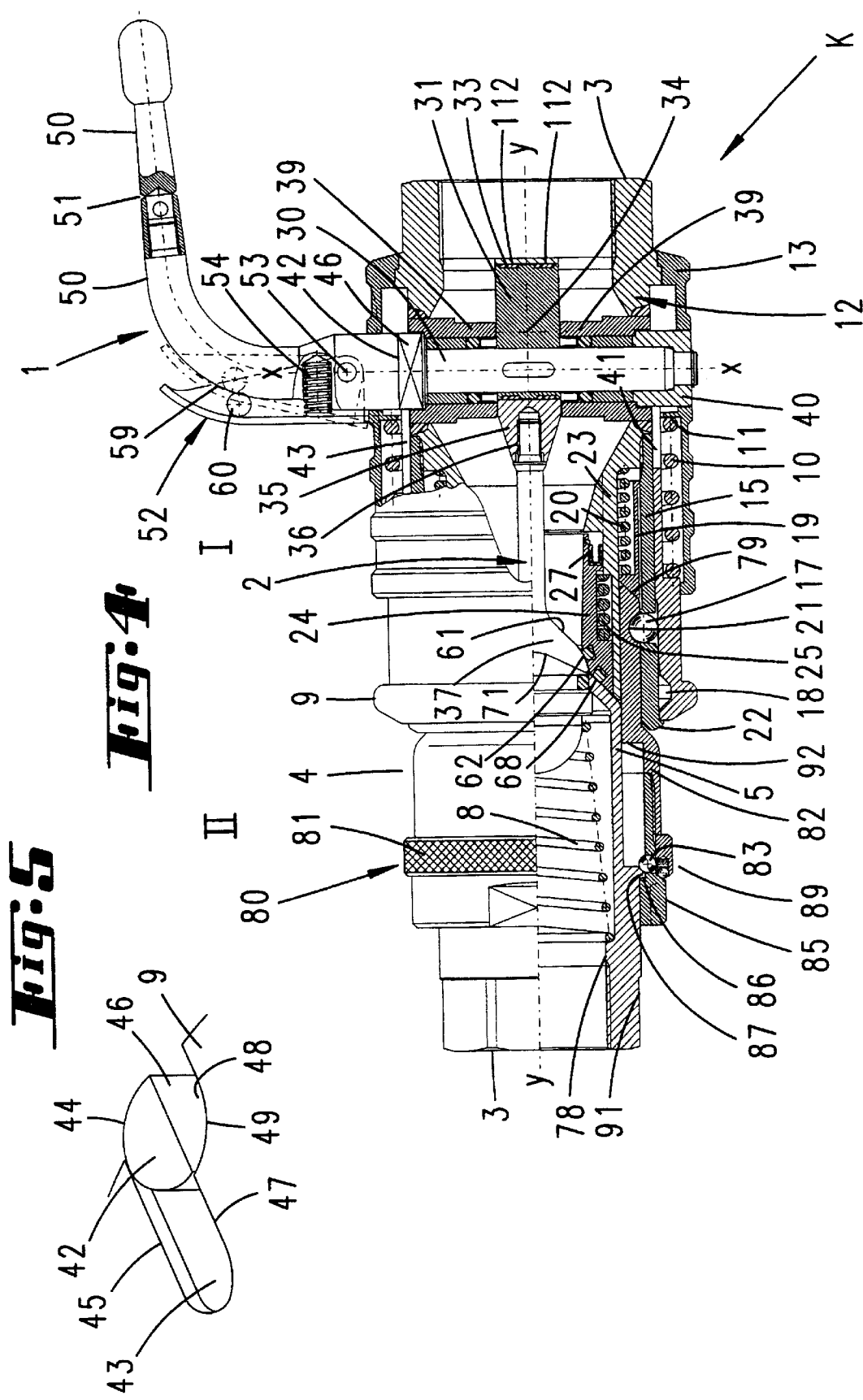
FIG. 4 shows the plug-in coupling in a coupled position.
FIG. 5 shows the enlargement of the position of the locking protrusion.
Figure 17:
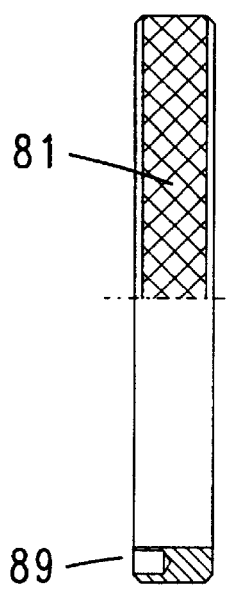
FIG. 17 shows the actuating ring of an unlocking device of the plug-in-nipple coupling part, to be precise half in section in front view.

The plug-in coupling K illustrated, which can be operated by one hand and also, according to the variant of FIG. 28, by more than one hand, serves for connecting pipelines, tubes or the like. It comprises two coupling parts, designated by I and II.

The coupling part I contains a valve body 2 which can be actuated from the outside by a hand lever 1. This makes it possible to release the media flow of the lines connected via screw-socket connections 3. The readiness for release depends on the position of a control element, which itself is subject to an activating mechanism, in conjunction with the external actuation.

The coupling part which is designated by II forms the plug-in nipple 4 of the plug-in coupling K. The housing 5 thereof accommodates a load-bearing part 6. This merges into a valve body 7 on the plug-in-joint side. Said valve body is loaded in the closing direction by a compression spring 8 which, remote from the valve seat, is supported on the housing.

In the plugged-together position of the plug-in coupling K, the valve body 7 maintains its closed position. It is opened, by hand-lever actuation, via the valve body 2 of the coupling part I, said valve body 2 acting as a push rod.

The coupling part I carries, as such a control element, in a longitudinally displaceable and stop-limited manner, a locking sleeve 9. The latter is spring-loaded in the direction of its locking position. This takes place via a compression spring 10. The compression spring 10 is supported, remote from the coupling joint, on an annular shoulder 11, fixed to the housing, as abutment. The housing 12, which is made up of a number of parts, is formed, behind the annular shoulder 11, as a grip sleeve 13, its grip being increased by radial annular ribs. That end of the compression spring 10 which is in the vicinity of the coupling joint acts against an annular shoulder 14 of the locking sleeve 9.

An annular-wall-forming intermediate sleeve 15 of the housing 12 is provided, in a common cross-sectional plane of the plug-in coupling K, with a row of transverse bores 16. The latter each accommodate one blocking ball 17. With the locking sleeve 9 drawn back, said blocking balls project into side movement groove 18 of the locking sleeve 9. There is thus an anchoring of the locking sleeve 9 in the displaced-back position, that is to say the release position. Radially inwardly directed displacement of the blocking balls 17 is prevented by a blocking-ball supporting sleeve 19 there, which can likewise be displaced in a stop-limited manner. Said supporting sleeve is loaded in the direction of the coupling joint by a compression spring 20. The other end of said compression spring is supported on the housing. When the plug-in connection is brought about, the blocking-ball supporting sleeve 19 is displaced axially into the housing, with the result that the blocking balls 17 can latch into a annular groove 21 in the casing wall of the plug-in nipple 4. In this case, the blocking balls 17 are released from the side movement groove 18. The locking sleeve 9 advances in the coupling-joint direction until it engages against a shoulder 22 of the intermediate sleeve 15. The inner wall of the locking sleeve 9 has a blocking-ball-deflecting action.

The housing 12 also comprises an inner sleeve 23. The latter guides a sliding sleeve 24 on the inside and is spring-loaded in the direction of the coupling joint. The sliding-sleeve spring carries the reference sign 25. The spring chamber 26 accommodating it is a constituent part of the sliding sleeve 24 and of the inner sleeve 23. The sliding-sleeve spring 25 is prestressed.

The sliding sleeve 24 leaves an axially oriented clearance. The meaning of this will be explained below.

An annular seal 27 is located in the tail region of the sliding sleeve 24. Said annular seal is positioned in a peripheral annular step and can be subjected to the action of media to produce an additional sealing effect. The annular shoulder, which tapers away upstream of the tail of the inner sleeve 23, can be leveled out at intervals, with the result that the media pressure has access and can act in a troublefree manner.

It can also be gathered from the drawing that, in a supported position of the valve body 2, the sliding-sleeve spring 25 is supported on an annular shoulder 28 of the housing 12, an annular shoulder 29 of the sliding sleeve 24 being set back significantly in relation to the same, a clearance being formed in the process (see FIG. 8). After actuation of the valve body 2 for the purpose of opening it, the clearance dimension of the clearance, designated by F, provides a gap-eliminating approach towards the nipple 4 in a coupling position. In addition, it is also the case that the prestressing is not lost in the disassembled state, because the annular shoulder 29 retains the spring 25.

The medium-throughflow-releasing longitudinal displacement of the valve body 2 takes place from the outside via a rotary actuation. The geometrical rotary-actuation axis carries the reference sign x—x. It is embodied as a solid shaft 30. The shaft passes through the coupling part I, to be precise, as can be gathered from FIG. 8, such that its axis is slightly offset in relation to the longitudinal center axis y—y of the rotationally symmetrically constructed plug-in coupling K. The shaft through-passage is sealed in relation to the media channel of the plug-in coupling K.

An eccentric 31 forms a motion-translating means. The eccentric is secured in a rotationally fixed manner in the central region of the shaft 30. The envelope curve of the eccentric 31 is designated by 32 and is indicated by chain-dotted lines in FIG. 8. The end of the valve body 2 there merges into a connecting-rod bearing 33, defining an anchoring point 34 of the valve body 2. The latter thus also functions as a connecting rod as well as a push rod and is screwed into a socket member 35. The threaded portion carries the reference sign 36. The eccentric anchoring point 34 as a point of rotation can be seen in said FIG. 8.

At the coupling-joint end, forming a valve head 37, the valve body 2 has a non-round formation which deviates from the cylindrical diameter, with the result that, for example, a wrench can be applied. The corresponding flattened portions 38 are located diametrically opposite one another.

By unscrewing the valve body 2, the internals of the coupling part I can be disassembled in removable manner from the coupling-joint, for example for cleaning purposes or for exchanging the seal 27, etc. In the open position, the displaced-forward valve body 2 can pivot in rotation about the anchoring point 34.

The eccentric 31 is supported in its central position at both ends via spacers 39. These are fixed to the housing and extend within the cavity of the locking sleeve 9. However, the latter is secured against rotation about its longitudinal axis by the rotary-actuation axis x—x. For this purpose, a cylindrical end bushing 40, which mounts the bottom end of the shaft 30 there, engages through a slot 41 of the locking sleeve 9 in an approximately radially directed manner. Said end bushing 40 is likewise fixed to the housing. It is seated in the grip sleeve 13. The slot 41 has a clear width which corresponds to the diameter of the cylindrical end bushing 40. The slot 41 opens in the direction of the right-hand end periphery of the locking sleeve 9. The length of the slot 41 takes into account the necessary clearance for the axial displacement travel of the locking sleeve 9.

The other end of the shaft 30, which is at the top in the drawing, is configured as an activating element. The rotary-actuation axis x—x is configured, in the region of the neck of the shaft 30 there, as a semicircular locking protrusion 42 located concentrically with the axis x—x. Said locking protrusion has at least a thickness which corresponds to the wall thickness of the locking sleeve 9. It passes through a guide slot 43 of the locking sleeve 9 there. Said guide slot also opens in the direction of the right-hand end periphery of the locking sleeve 9. The clear width of the guide slot 43 is dimensioned such that the semicircular profile of the locking protrusion 42 is guided on the parallel flanks of the guide slot 43 not without a certain amount of play. Reference is made to FIG. 11. The arcuate surface 44 of the locking protrusion 42, which enters into the guide slot 43 and/or is overrun by said guide slot, engages against a flank 45 which is formed to be longer, and/or is directed toward said flank, while the rectilinear surface 46, which is located in the diameter of the shaft 30, is directed toward a shorter flank 47 of the guide slot 43 such that rotation of the shaft 30 is prevented in this position. This is the release position (FIG. 11) of the locking sleeve 9.

In contrast, FIG. 12 shows, in activation terms, the locking position. In this position, the locking sleeve 9 has been advanced in the direction of the coupling joint. In this case, the guide slot has overrun the shaft 30 to such an extent that the end region of the locking sleeve 9 is closer to the shaft 30. In this position, the shaft can be rotated by a full 180°, with the result that the locking protrusion 42 has its arcuate surface 44 directed toward the lower edge of the drawing. In this region, the relatively narrow guide slot 43 merges into a lateral free space 48, to be precise a blocking flank 49 being produced in the process. The locking protrusion 42 can enter into said free space 48. It is then no longer possible for the locking sleeve 9 to be displaced axially to the right by external actuation. It is blocked. Its coupling-joint end, which forms a gripping bead, is located at the shoulder 22 of the housing 12.

FIG. 13 shows a position, also to be explained below, which arises when the locking sleeve 3, rather than having moved right up against the stop-forming shoulder 22, has stopped at a distance z in front of the same (see FIG. 21).

Above the locking protrusion 42, the shaft 30 continues into the hand lever 1, ending in an angled hand-lever grip 50. The latter has a predetermined breaking point 51 (not illustrated in full). This means, which also increases the safety, indicates forced opening attempts and takes effect before internally-fitted parts of the coupling part I are destroyed and/or the coupling is damaged in any way. A catch 52 is placed in the foot region of the grip 50 of the hand lever 1. Said catch is double-armed and pivots about a bearing pin 53. The latter intersects the geometrical rotary-actuation axis x—x. The catch 52 is subjected to spring loading. A compression spring 54 is in question. The spring loads the catch 52 in the blocking-engagement direction. The mating blocking means on the housing is a latching rib 55. This extends longitudinally along the diameter line of a through-passage bore 56 for the foot of the hand lever 1. The head of the catch 52, which is directed toward the grip sleeve 13, has a capturing slot 57 in which the cross section of the latching rib 55 of the grip sleeve 13 engages. Located on both sides of the capturing slot 57 are latching slopes 58 which ensure reliable latching into the blocking position. The two end positions of the hand-lever grip 50, which can be rotated through 180°, can be arrested and released in this way.

The longer, upper arm of the catch 52, for this release, can be pivoted against the corresponding rear 59 of the hand-lever grip 50. In this position, the head is out of blocking engagement with the latching rib 55.

The pivoting region up to the stop-forming rear 59 is utilized further. This is because said actuating path, which is necessary in any case, of the catch 52 can be blocked via a lead-seal device (not illustrated specifically). For this purpose, a blocking bar of the lead seal passes through said actuating path. The blocking bar passes through congruently located holes 60 in the legs of the catch 52 which is formed to be U-shaped in cross-section.

Now to the other sealing measures in the coupling part I. Alongside the already described annular seal 27 between housing 12 and the sliding sleeve 24, which can be displaced in relation thereto, a further seal is located in the region of the valve head 37. There, the plug-in end of the valve body 2 is drawn against a seat seal 62 by way of a curved rear side 61 and/or the sliding sleeve 24 is supported primarily there by the said seat seal 62. The sleeve 24, then, has a shaped portion 63 which corresponds to the curved rear side 61 and beyond which the body of the seat seal 62 would project slightly if the valve head 37 were not placed in position. In the loaded state, the shaped portion 63 has definitive load-bearing properties. In order to accommodate the seat seal 62, there serves an annular groove 64 in the sliding sleeve 24, the sleeve being spring-loaded in the sealing direction.

While in respect of the seat seal 62, an O-seal may be in question, the annular seal designated by 27, according to FIG. 8, is a so-called square ring. The annular seal 27 is accommodated in a displacement-free manner. Reference is made to FIGS. 9 and 10. FIG. 9 shows the annular seal 27 in a basic position and FIG. 10 shows the annular seal with displacement of the sliding sleeve 24, said displacement taking place as the valve body 2 moves into the open position. This movement follows the mechanical locking of the coupling parts I, II and thus provides perfect sealing in relation to the coupling part II, that is to say the plug-in nipple 4. The fine joint between the two is closed in the process.

The cross section of the annular seal 27 corresponds approximately to a pawl-cross. Starting from the basically square outline, the corners are configured as exposed, convexly rounded ridges with an indent 65 located therebetween on the sides of the square. This results in an easily deformable cross section and thus in a shearing deformation without any displacement, for example, on the base of a groove 66 of the housing 12, approximately the outer half of the cross section of the body of the annular seal 27 engaging in said groove 66, while the inner half of said body, following the displacement of the sliding sleeve 24, stretches in the direction of the coupling joint. This is all assisted here as well by the media pressure. Protrusions of the axially displaceable parts may project into the indents in the centers of the sides, functioning, as it were, as driving protrusions.

In this media-pressure-concerning context, reference is also made to a variant illustrated in FIG. 23. This is basically of the same construction as the solution portrayed in FIG. 8. Here too, an annular seal 27 is inserted in the region of the tail of the sliding sleeve 24, although in this case this sliding sleeve 24, instead of a rigid sleeve wall, has a wall in the form of a corrugated tube. The corresponding metal folding bellows is secured on the left-hand solid part of the sliding sleeve 24, and carries the annular seal 27 in a pocket at the end. The sliding sleeve 24 fulfils a dual purpose in that, in addition to providing the length compensation for the valve-piston movement, that is to say for the sliding sleeve 24, it also assumes the function of the sliding-sleeve spring 25. Here too, the annular seal 27 is in positive engagement with the sliding sleeve 24 and also with the housing 12, in a manner similar to the situation illustrated in FIGS. 9 and 10.

On its plug-in-end head surface 67, the sliding sleeve 24, which finds its engagement against the rear side of the valve body 2, has a second seat seal 68. In this case too, there is in question an O-ring, accommodated in a second groove 69, which is located concentrically with the groove 64. It is also the case that, in the non-loaded state, the second seat seal 68 projects slightly beyond the level of the head surface 67. Said surface adjoins the shaped portion 63, which is closer to the center, via an annular ridge.

The second seat seal 68 interacts with the head surface 70 of the other coupling part II, that is to say the plug-in nipple 4.

The head surface 70 of the plug-in-nipple coupling part II is formed to be substantially curved, this to match a correspondingly curved recess 71 of the valve body 2 (see, for example, FIG. 1). It can be seen that the curved configuration of the head surface 70 of the plug-in nipple is made up of a central ball portion 72 with an adjoining shallow truncated cone 73. The same contour is repeated at the outer end of the valve head 37 and in the surrounding region of the coupling part I which adjoins the valve head peripherally.

In the plugged-in position of the plug-in coupling K, the curved head surface 70 is located at a small spacing from the seat seal 68 of the sliding sleeve 24 associated with it.

In the course of the plugging-in movement of the coupling parts I, II, during its opening displacement, the valve body 2 displaces the center of the head surface 70 in relation to the encircling front surface 74 of the plug-in nipple 4. The valve body 7 is pushed back counter to spring loading by the compression spring 8. This opening results in media throughflow. This situation is represented in FIG. 6. It can be seen that the valve head 37 of the valve body 2 passes through a front opening 75 of the front surface 74 of the plug-in nipple 4.

The two valve bodies 2 and 7 are self-centered coaxially in relation to one another as a result of the described joining means 71 to 73. In order nevertheless for the load-bearing part 6 to be secured against lateral displacements in the case of high media pressures, a valve guide 76 is plugged in behind its neck. There is in question a ring with three radially outwardly projecting guide feet 77 disposed at equal angles. The guide feet bridge over the circumferential free region between load-bearing part 6 and the inner wall of the plug-in nipple 4. The division into three makes sense in so far as, by way of the angle region in between, it leaves a plugable diameter for the ring body. The corresponding rear plug-through opening of the coupling part II carries the reference sign 78. The compression spring 8 is held on a shoulder just behind this plug-through opening. The end winding in this respect as base of a conical helical spring can be narrowed slightly, counter to the restoring force thereof, for threading-in.

In the direction of the opening 75, the valve body 7 causes a radial seal 7', held in an annular groove. The front surface 70, in the context of the moveable section in the sleeve-like housing 5 of the plug-in-nipple coupling part II, can only be displaced beyond the plug-in-side front wall 79 of the plug-in-nipple housing 5 following unlocking. The unlocking device 80 in this respect allows locking and unlocking by means of an actuating ring 81. The latter is guided rotatably in a groove on a casing sleeve 82 of the housing 5 of the plug-in nipple 4, this casing sleeve forming the front wall 79. The casing sleeve 82 can be displaced longitudinally in a stop-limited manner such that the head surface 70 of the plug-in nipple 4 can be transferred into an exposed cleaning position. This is represented in FIG. 1. On the other hand, the same unlocking device 80 secures the position in which the plug-in nipple 4 is ready to be plugged in. This position is present when the plug-in nipple 4 has been drawn back fully under cover. Reference is made to FIG. 3. When the front surface 70 of the plug-in nipple 4 is in an exposed position, coupling to the coupling part I is not possible. In this arrested advanced position, the encircling front surface 74 would move against the coupling-joint-side end surface of the inner sleeve 23 of the housing 12. This acts in a manner blocking plugging-in action.

The actuating ring 81 is located to the rear of the annular groove 21, into which the blocking balls 17, controlled in the inward direction by the locking sleeve 9, pass. This is possible since the front wall 79 of the casing sleeve 82 withdraws the support from the blocking balls 17 by the front wall 79 pushing the blocking-ball supporting sleeve 19 inward counter to the force of the compression spring 20. Once the blocking balls 17 have passed in, the locking sleeve 9 moves abruptly, by spring loading, into its securing locking position.

The ready-for-coupling position of the plug-in nipple 4 is secured by disengageable balls 83. These are located in transverse bores 84 of an additional sleeve 85 which is screw-connected to the casing sleeve 82. Said additional sleeve has a shoulder 86. That part of the housing 5 which constitutes the plug-in nipple 4 engages against said shoulder. Conversely, the housing 5 forms an annular rib 87, and the balls 83 engage against the beveled flank of the rib which is directed toward the coupling joint, to be precise when the plug-in nipple 4 is displaced back.

Figure 18:
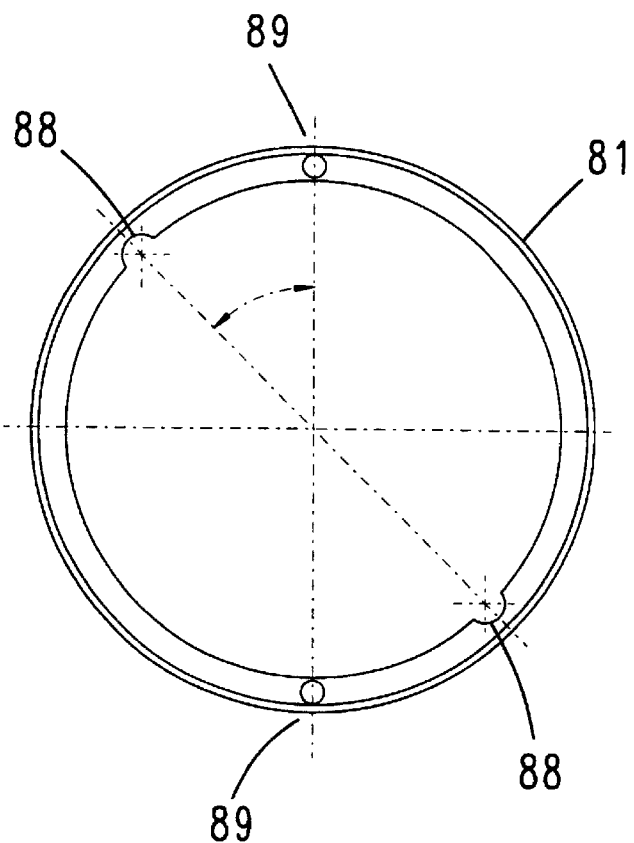
FIG. 18 shows the plan view of the actuating ring.
Figure 19:
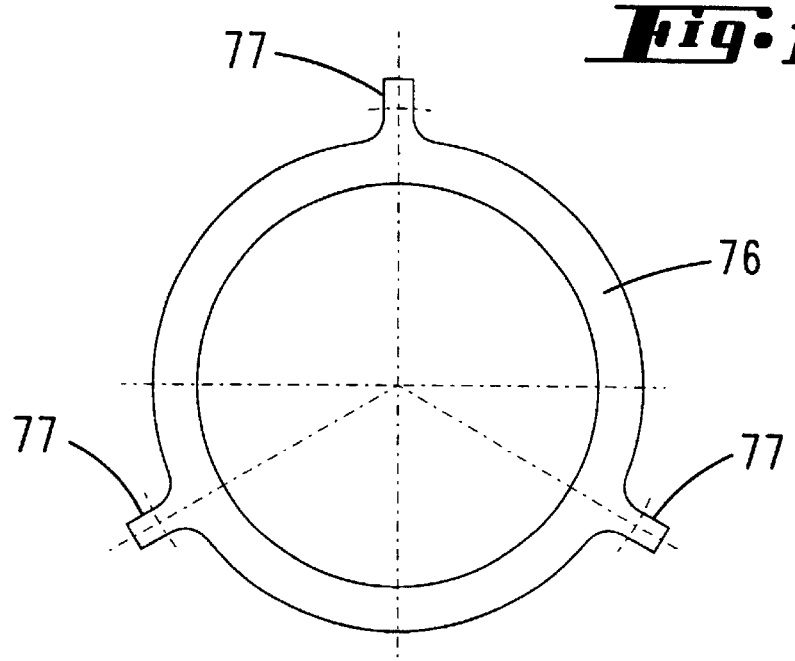
FIG. 19 shows the plan view of a retaining ring as a valve guide of the plug-in-nipple coupling part.

As can be seen from FIG. 18, the actuating ring 81 has side movement niches 88. As soon as, with rotation of the actuating ring 81, the transverse bore 84 and side movement niche 88 are located congruently, the blocking action is released. The casing sleeve 82 and housing 5 can be displaced relative to one another in a stop-limited manner.

The correct locking and unlocking position is defined by catch locations 89. Blind bores 90 are formed on the ring side for this purpose, spaced apart at an angle from the side movement niches 88. Said blind bores accommodate the catch spring and a catch ball, which interact with a corresponding latching depression on the additional sleeve 85. In the advanced position of the plug-in nipple 4, the balls 83 at the same time bring about a securing action by engaging there in an annular channel 91 of the housing 5. The annular rib 87 engages against a stop shoulder 92 of the casing sleeve 82. This connection can also be released by the balls 83 moving sideways into the side movement niches 88 which approach then by virtue of the actuating ring 81 being rotated. In a blocking position, the balls 83 are supported on the inner wall of the actuating ring 81.

Overall, there is provided a plug-in coupling K, the valve body 2 of which can be actuated by the hand lever 1, the interposed controlling element being constituted by the locking sleeve 9 in conjunction with the locking protrusion 42, which locking sleeve 9 can be displaced from a locking position, in which the plugged-together position of the two coupling parts I/II is secured by spring loading, into the release position, such that the external actuation of the valve body 2 in a release position of the locking sleeve 9, which is retained there despite spring loading, and the displacement of said locking sleeve into the release position (FIG. 3) in the open position of the valve body are blocked. The locking protrusion 42 is located in the blocking region of influence of the narrower portion of the guide slot 43. Coupling of the two coupling parts I, II is thus required. It is only as a result of this that the blocking balls 17 engage and the locking sleeve 9 can advance. Thus, in changeover terms, the position according to FIG. 11 is left behind and the position according to FIG. 12 is entered. In this position, following the correct coupling, the valve body 2 can thus be moved into the open position via the eccentric mechanism 30/31/33/34. The hand lever 1 is rotated through 180°. The locking sleeve 9 is then secured in its advanced position. During the opening displacement of the valve body 2, the sliding sleeve 24, previously supported by the valve head 37, loses its grip thereon. It is then pushed with fixed sealing abutment, in a gap-eliminating manner, against the fixed head surface 70 of the plug-in nipple 4. The annular seal 27 moves along therewith in a friction-free manner. According to FIG. 12, the locking protrusion 42 moves into the free space 48, in which case the arcuate surface 44 comes into engagement against the blocking flank 49 of the locking sleeve 9. In this coupling position, accordingly, it is also the case that the locking sleeve 9 cannot be displaced back, unless the abovementioned activation procedure were carried out. As far as the guide slot is concerned, the contour which is selected is such that the two blocking positions are associated in each case with the end regions of the displacement of locking sleeve 9 and external actuation. On the way to the respective end positions, it is thus not possible for incorrect operation to take place.

If the rectilinear surface 46 of the locking protrusion 42 has thus not overrun the shortest length 47 of the locking protrusion 42 to the full extent, release of the valve body 2 via the hand lever 1 cannot take place.

This stipulation is utilized, according to the illustration in FIGS. 21 and 22, for a further-reaching function, in conjunction with the abovementioned spacing z. In these figures, there is protective covering of the coupling part I using a cap-like closure stopper 93. The latter functions as a dust cap and, as far as the locking means is concerned, is constructed in a manner similar to a plug-in nipple, i.e. it has a front wall 79 which, when positioned relative to the blocking-ball supporting sleeve 19, pushes the latter away and thus allows the blocking balls 17 to engage in the annular groove 21, which is also realized here, support being given by the corresponding inner surface of the locking sleeve 9. The latter, however, is prevented from moving into its stop location, realized by the shoulder 22. It thus does not pass into its securing end position. Rather, any further displacement is prevented by a sleeve-wall portion 94 of the cap-like closure stopper 93, said sleeve-wall portion projecting significantly beyond the shoulder 22 in the direction of the hand lever 1. Said closure stopper is held in captive fashion on the coupling part I via a chain 95. The lower end of the shaft 30 is used for this purpose, a ring-retaining means being formed in the process. Such a retaining means is also located on the top of the closure stopper 93. A sealing ring 96 is disposed between the lateral wall of the inner sleeve 23 and that wall of the closure stopper 93 which is equivalent to the casing sleeve 82.

Figure 20:
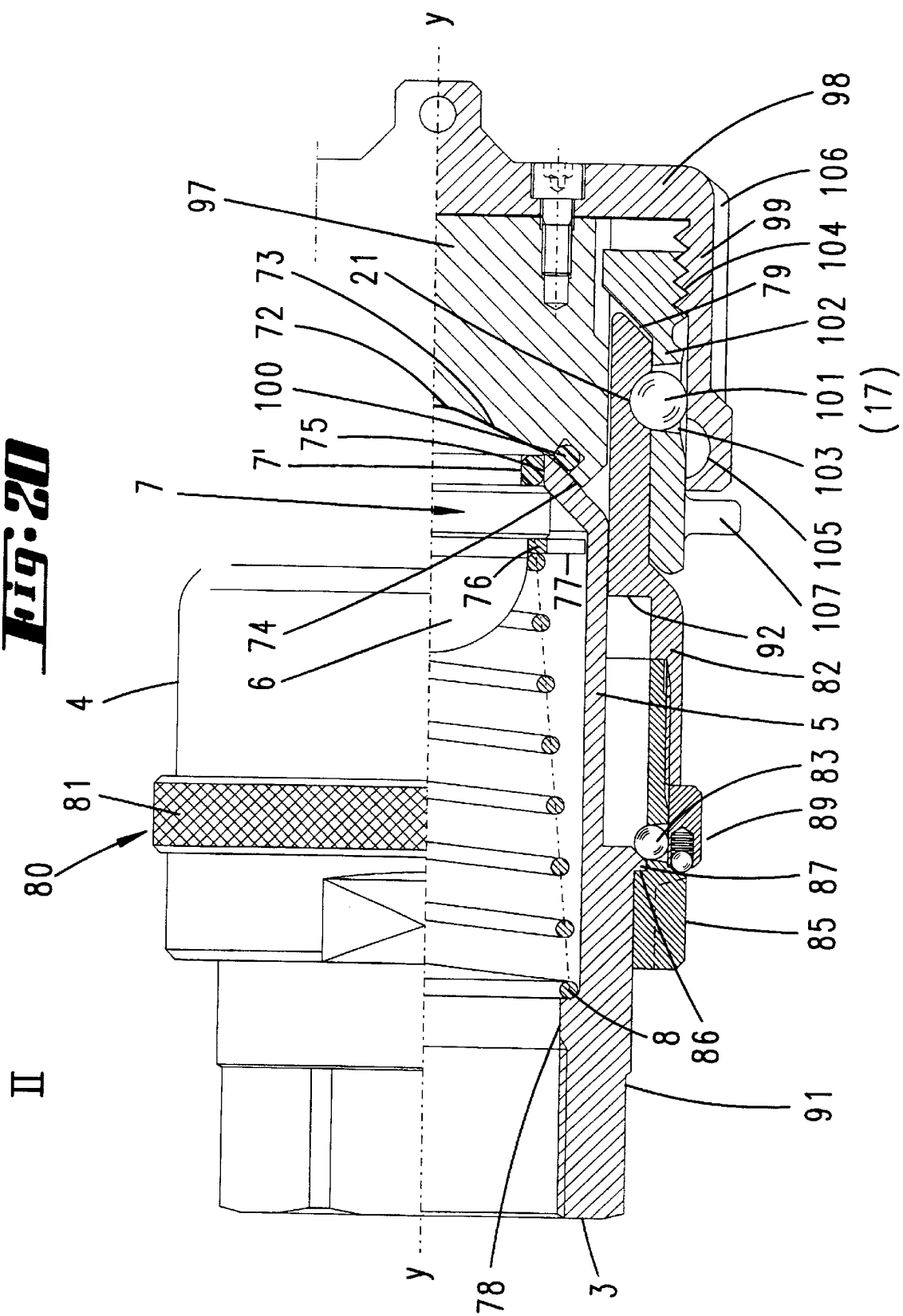
FIG. 20 shows the plug-in-nipple coupling part with associated dummy stopper.

FIG. 20 illustrates a nipple-side further embodiment. There is in question a dummy stopper 97 which can be associated with the nipple side. Anchoring of the dummy stopper is effected by use of the annular groove 21, with which the blocking balls 17 interact in the manner described. An arrangement which is comparable to the basic principle is realized here. For better understanding, the reference numerals have been taken, so far as is necessary for understanding, from the illustrations described above. It can be seen that a cap 98 is associated with the stopper 97 or is integrally formed thereon. The cap constitutes a cup-like sleeve wall 99 which engages over the dummy stopper 97 leaving an annular space around the periphery.

Located in the concave contour of the dummy stopper 97 is a seat seal 100, which is comparable to the seat seal 68 of the sliding sleeve 24. The seat seal 68 moves against the encircling front surface 74 of the plug-in nipple 4. It engages against the surface 74 under loading and has a high-grade sealing action. The blocking balls 17, which interact with the annular groove 21, are referred to here as retaining balls 101. They are accommodated in an inner sleeve 102. The latter has transverse bores 103. The retaining balls 101 can be directed by the screw-action displacement of the cup sleeve wall 99 of the cap 98 relative to the inner sleeve 102. In this respect, the sleeve wall 99 functions, at the same time, as a locking sleeve. The thread for the screw-action displacement is realized on the joint-side parts between inner sleeve 102 and sleeve wall 99, designated by 104.

All that is required in order to detach the dummy stopper 97 is for the cap 98 to be unscrewed for release. In this case, the sleeve wall 99 is displaced to the right in the drawing. As soon as an annular groove 105 formed on the inner wall surface of the sleeve wall, said annular groove being comparable to the side movement groove 18, has moved into the plane of the retaining balls 101, the retaining balls 101, giving up the anchoring of the dummy stopper 97, can move out into the annular groove 105. The dummy stopper 97 can be drawn off in this way. It too can be secured in captive fashion on the coupling part I via a chain.

An actuation-facilitating measure, then, also consists in that the cup sleeve wall 99 and the freely projecting, plug-in-nipple-side end portion of the inner sleeve 102 are provided with gripping ribs 106 and 107, respectively.

Coming back to FIG. 8, it also remains to be emphasized that the anchoring point 34 runs through an arcuate path which encircles the geometrical rotary-actuation axis x—x and is somewhat greater than 180°. The anchoring point 34 thus moves into a self-blocking dead-center-position arrangement. Since the articulation point at 34 is offset in relation to an imaginary pulling direction of the valve body 2, caused by the sliding-sleeve spring 25, the hand lever 1 achieves a defined end position, although the latter can easily be overcome at will. It is also the case that pressures acting on the valve body 2 in the opposing direction are not capable of rotating the shaft 30. Hence the slight guide play between locking sleeve 42 and guide slot 43.

Figure 25:
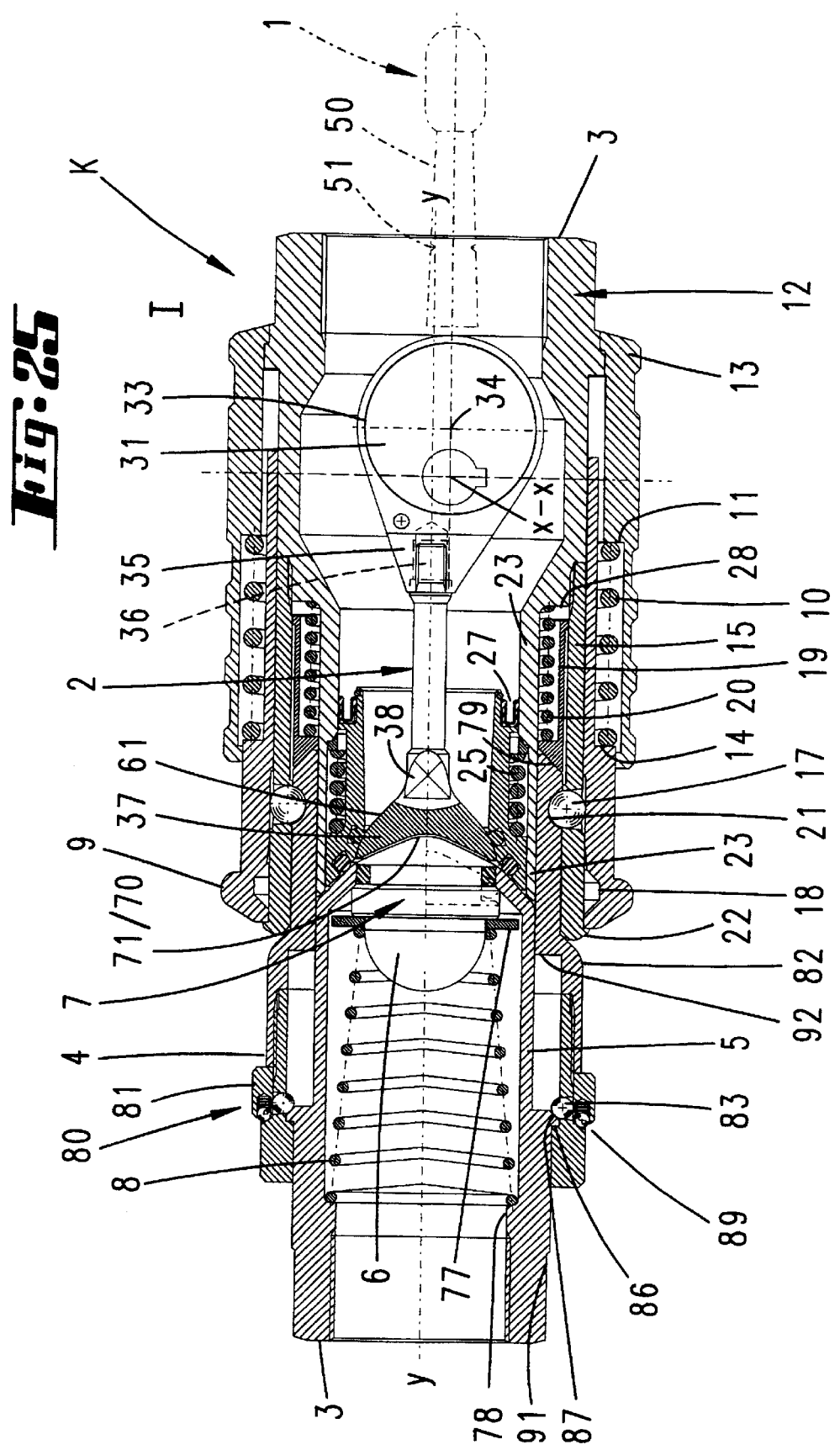
FIG. 25 shows the plug-in coupling in a coupled position, closed, in section in the connecting-rod pivoting plane.

That variant of the plug-in coupling K which is represented in FIGS. 25 to 27 is, in principle, of the same construction as the basic version. The illustration is equivalent to FIG. 8, although the latter, in part, is shown in two planes at the same time. FIG. 25 ff shows the said plug-in coupling in a central cross-sectional plane of the shaft 30. The reference numerals are set down without going into the corresponding details once again in the text; these details can be gathered from the basic version described in depth.

In terms of movement, the anchoring point 34 of the connecting-rod bearing 33, said anchoring point encircling the rotary-actuation axis x—x of the shaft 30, also has a direction-adjusting action on the valve head 37, which is retained centrally in the coupling position. The unaffected, supported position of the valve head 37 can be gathered from FIG. 25. If the grip 50 of the hand lever 1 is then moved in the anticlockwise direction, the valve body 2 moves into the tilted position, which can be seen in FIG. 26 and can also be seen to be capable of being continued some way further. The housing provides sufficient free space. This results, in the plugged-together position of the coupling K (FIG. 25), in one valve body 2 subjecting the other valve body 7 primarily to action at the periphery and thus, finally, in said valve body 2 effecting opening of the other valve body 7 of the coupling part 2.

Since the other valve body 7 is disposed in a sealing but also moveable manner in the other coupling part II, it moves along with the movement performed by the valve body 2. According to the illustration in FIG. 26, this results in an axially-directed higher pressure application point a of the valve body 7. In contrast, the other pressure application point b trails to a considerable extent in the axial direction. It constitutes, as it were, an initially acting tilting point. It increasingly forms a fine crescent-moon-like opening slot.

Since the valve body 7 is not pushed axially as a whole in the direction of the open position right away, extremely moderate actuating forces prevail (roughly comparable to a four-legged table which is only raised from one corner). Of course, it is also the case that the actuation, which is correspondingly favorable in terms of leverage, acts in a wholly gentle manner on the internals of the plug-in coupling K. Incompressible media can thus be released in an extremely favorable manner in flow terms even under high pressure. This all takes place, also on account of the above described arrangement of the seat seals 62, 68, 7', in a virtually leakage-free manner as well. The actuating travel begins with transverse arcuate displacement of the anchoring point 34, said displacement being favorable in terms of leverage and thus requiring only a low level of force.

The pivoting-angle path, which extends beyond the initial pivoting range of the hand-lever grip 50 of approximately 30° and in total extends beyond well over 180°, brings about the axial displacement of the valve body 7 into the nipple 4 with simultaneous transverse pivoting and, finally, a fully fixed direction. This produces a uniform annular-gap-like flow path, circumscribed by the front opening 75.

In this case too, as in the basic version, the spring 8, which supports the valve body 7, is realized as a helical spring. The windings thereof taper continuously in the direction of the valve body 7, so that a conical helical spring is in question. This retains, at the same time, the annular valve guide 76 on the valve body, supported via the abovedescribed guide feet 77 in order to aid tilting. As can be seen from FIG. 26, sufficient play is provided.

As can also be gathered, in particular, from FIG. 26, the valve body 7, as far as the sealingly-active side is concerned, is accommodated in a cylindrical valve seat with which there is associated, on the valve-seat side, on the valve body 7, a radial seal 7'. This is accommodated in an annular groove of the valve body 7 and can be exchanged by the internals being moved back to the left.

Coming back to the explained tilting capability of the parts which are in narrow-gap contact with one another at the end at 70/71 via sealing bodies, it remains also to be emphasized that, with actuation of the connecting-rod drive, the axis y'—y' of one valve body 2, this body, at the beginning of the opening movement, assumes a tilted position which does not coincide with the longitudinal center axis y—y of the coupling K. There is in question an acute-angled alignment, as can be seen from the progression of the shank of the valve body 2, enclosing an acute angle 108 of approximately 3° to 5°, achieved with an initial angle of rotation of approximately 30° of the hand-lever grip 50. Following this tilted position according to FIG. 26, from the vertex, the shank of the valve body 2 is guided back, which results, finally, in a coaxial or coinciding alignment of the axes y—y, y'—y'.

When in aligned orientation with the longitudinal center axis y—y of the coupling K, the valve body 2 has a closure edge running perpendicularly to the longitudinal center axis y—y, said edge being defined by the periphery of the valve head 37 and/or the periphery of the head surface 70 of the other valve body 7, which surface is formed to be dome-like.

Now to the securing of the shaft 30: reference is made to FIGS. 21 and 24 in this respect. FIG. 21 enables an expanding ring 109 to be identified, which butts against the lower end edge of the end bushing 40 there and secures the shaft 30 against being drawn out upward. Accordingly, this should not be detachable during operation.

According to the further representation of FIG. 24, said expanding ring 109 itself is also secured against detachment. For this purpose, it is provided that the shaft 30 is furnished, beneath the end bushing 40, with the retaining ring 109, fitted with a means which prevents it from being drawn off. In a further feature here, the securing of the retaining ring 109 against expansion is assumed by a securing bushing 110. This is of cup-like configuration and has an annular flank of a step recess supporting the retaining ring 109 on the periphery. The cup-like securing bushing 110 encircles a stepped end portion of the end bushing 40. The base of the cup-like securing bushing 110 accommodates the free, reduced-diameter end of the shaft 30.

The securing bushing 110 could be screw-connected as a result of the over-engagement provided in the direction of the end bushing 40; in reality, however, a simple plug-in connection is selected, the cup-like securing bushing 110 itself being secured on the shaft 30 by a split pin. The radially associated split pin, which passes through congruent through-passages in the securing bushing 110 and the shaft end, carries the reference sign 111. This is located just beneath an annular groove of the shaft 30 which accommodates the resilient retaining ring 109.

Coming back to the connecting-rod bearing 33, it is also to be noted that this bearing is arranged for ease of sliding. There is in question an annular sliding element designated 112. This is seated in a groove between the cylindrical joint of the connecting-rod bearing 33 and that wall of the socket member 35 which forms the associated bearing eyelet.

The sliding element 112 is, as is illustrated, provided in pairs. Two rings are spaced apart axially from one another. In order to modify the ease of sliding and to achieve a wear-reducing configuration, it is provided that the sliding elements 112 consist of, or are produced from, plastics material, preferably containing a fiber-reinforced component, for example Teflon.

FIG. 28 shows a plug-in coupling K associated with an installation. The constructional principle of this plug-in coupling corresponds to that described above. Here too, so far as is necessary for understanding, the reference numerals are used analogously, in part without being repeated in the text. The details of the installation will not be gone into any further since the drawing already has a self-explanatory character.

The main difference is in the formation of the actuating means, that is to say of the hand lever 1. As a handle, the latter is provided in the manner of a four-way wrench with two hand-lever grips 50. The four-way wrench merges, via a shank 113, into a double-bit-like wrench head 114. On the coupling part, seated on a rotary arm, the corresponding mating means provides a matching wrench slot 115, realized on a head-side socket portion 116. A groove, for example, is formed beneath the slot 115 and results in the shaft 30 being driven, to be precise running through an angle of rotation value of a good 180°, as has been described in detail in relation to the basic version. The rotary arm is mounted in a horizontally running and vertical manner.

Such a hand lever can be removed and stored separately, on the one hand for safety reasons but, on the other hand, also in order to avoid the hand lever 1 protruding in a projecting manner.

In this plug-in coupling K, the locking sleeve 9 is further configured in regard to handling capability. If it is otherwise normally sufficient to have a rearwardly-engageable annular collar 117 at the plug-in-joint end of the said locking sleeve 9, then, in the present installation, said collar of the plug-in coupling K is now provided with a larger-diameter grip ring 118 compared therewith. This can be gripped by more than one hand. It is connected to the locking sleeve 9 via radial spokes 119. The spokes 119 are aligned in a sloping manner. The radial distance between the gripping ring 118, which is even roughened for ease of grip, and the sleeve wall of the coupling housing is sufficient for a generous grip-through space to remain. The gripping ring 118 assumes a substantially perpendicular alignment in relation to the longitudinal center axis y—y of the plug-in coupling K.

With reference to FIG. 29, it is also to be mentioned that the annular seal 27 of the sliding sleeve 24 has an O-ring 120 mounted upstream of it on the coupling-joint side. The downstream annular seal 27 is inserted such that its U-opening is oriented in the direction of the medium, with the result that the pressure of the medium, for the purpose of improving sealing, results in a spreading of the U-legs and thus in firmer engagement against the corresponding annular-groove walls, constituted by the inner sleeve 23 and the sliding sleeve 24. There is also a pressure component in the axial direction, with the result that the annular body 120 is subjected to sealing-increasing deformation pressure.

What is claimed is:

1. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein the other valve body (7) is displaceable both with tilting movement and also axially in the other coupling part (II).

2. Plug-in coupling according to claim 1, wherein two blocking positions are associated with end regions of the displacement of the locking sleeve (9) and external actuation.

3. Plug-in coupling according to claim 1, wherein the external actuation takes place by means of a rotary actuation which is converted into a longitudinal displacement of the valve body (2).

4. Plug-in coupling according to claim 3, wherein rotary-actuation axis (x—x) continues into a hand-lever grip (50).

5. Plug-in coupling according to claim 1, wherein a plug-in end of the valve body (2) is drawn against a seat seal (62) by a curved rear side (61).

6. Plug-in coupling according to claim 5, wherein the seat seal (62) is disposed in a sliding sleeve (24) which is spring-loaded in a sealing direction.

7. Plug-in coupling according to claim 6, wherein the sliding sleeve (24) engages against the rear side (61) of the valve body (2) in a decoupled position.

8. Plug-in coupling according to claim 1, wherein the other valve body (7) is mounted by being supported by means of a helical spring (8).

9. Plug-in coupling according to claim 1, wherein the valve body (7) is accommodated into a cylindrical valve seat with which, on the valve-seat side, a radial seal (7') is associated.

10. Plug-in coupling according to claim 1, wherein the locking sleeve (9) carries a freely projecting gripping ring (118) which runs substantially transversely to longitudinal center axis (y—y).

11. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein the external actuation is a rotary actuation effecting a longitudinal displacement of the valve body (2), and wherein rotary-actuation axis (x—x) carries a semicircularly-formed locking protrusion (42) which is located concentrically with the axis and with which a guide slot (43) of the locking sleeve (9) is associated, such that, in a release position of the locking sleeve (9), the semicircular profile of the locking protrusion (42) enters into the guide slot (43) with engagement on both sides and, in a release position of the locking sleeve (9), arcuate surface (44) of said semicircular profile, entering into a free space (48), moves into the guide slot (43) in front of a blocking flank (49), to a side of the guide slot.

12. Plug-in coupling according to claim 11, wherein the external actuation takes place by means of a rotary actuation which is converted into a longitudinal displacement of the valve body (2).

13. Plug-in coupling according to claim 12, wherein rotary-actuation axis (x—x) continues into a hand-lever grip (50).

14. Plug-in coupling according to claim 11, wherein a plug-in end of the valve body (2) is drawn against a seat seal (62) by way of a curved rear side (61).

15. Plug-in coupling according to claim 14, wherein the seat seal (62) is disposed in a sliding sleeve (24) which is spring-loaded in a sealing direction.

16. Plug-in coupling according to claim 15, wherein the sliding sleeve (24) engages against the rear side (61) of the valve body (2) in a decoupled position.

17. Plug-in coupling according to claim 11, wherein an other valve body (7) is mounted by being supported by means of a helical spring (8).

18. Plug-in coupling according to claim 11, further comprising another valve body (7) in another, second coupling part (II), and wherein the valve body (7) is accommodated into a cylindrical valve seat with which, on the valve-seat side, a radial seal (7') is associated.

19. Plug-in coupling according to claim 11, wherein the locking sleeve (9) carries a freely projecting gripping ring (118) which runs substantially transversely to longitudinal center axis (y—y).

20. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein the external actuation takes place by means of a rotary actuation which is converted into a longitudinal displacement of the valve body (2), wherein rotary-actuation axis (x—x) has an eccentric (31) on which the valve body (2) is articulated via connecting-rod bearings (33), forming an anchoring point (34).

21. Plug-in coupling according to claim 20, wherein in a position in which it has been displaced in the opening direction, the valve body (2) is mounted such that it is pivotal about its anchoring point (34) on the rotary-actuation axis (x—x).

22. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein the external actuation takes place by means of a rotary actuation which is converted into a longitudinal displacement of the valve body (2), wherein rotary-actuation axis (x—x) carries a semicircularly-formed locking protrusion (42) which is located concentrically with the axis and with which a guide slot (43) of the locking sleeve (9) is associated, such that, in a release position of the locking sleeve (9), the semicircular profile of the locking protrusion (42) enters into the guide slot (43) with engagement on both sides and, in a release position of the locking sleeve (9), arcuate surface (44) of said semicircular profile, entering into a free space (48), moves into the guide slot (43) in front of a blocking flank (49), to a side of the guide slot.

23. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein the external actuation takes place by means of a rotary actuation which is converted into a longitudinal displacement of the valve body (2), wherein locking sleeve (9) is secured against rotation.

24. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein the external actuation takes place by means of a rotary actuation which is converted into a longitudinal displacement of the valve body (2), wherein rotary-actuation axis (x—x) continues into a hand-lever grip (50), wherein the hand-lever grip (50) has a predetermined breaking point (51).

25. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein the external actuation takes place by means of a rotary actuation which is converted into a longitudinal displacement of the valve body (2), wherein rotary-actuation axis (x—x) continues into a hand-lever grip (50), wherein the hand-lever grip (50) is provided with a catch (52).

26. Plug-in coupling according to claim 25, wherein actuation path of the catch (52) is blockable via a lead-seal device.

27. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein a plug-in end of the valve body (2) is drawn against a seat seal (62) by a curved rear side (61), wherein the seat seal (62) is disposed in a sliding sleeve (24) which is spring-loaded in a sealing direction, wherein an annular seal (27) is associated with the sliding sleeve (24) which annular seal, being in positive engagement with the sliding sleeve (24) and the coupling-part housing (12), compensates for movement of the sliding sleeve (24) by itself deforming.

28. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein a plug-in end of the valve body (2) is drawn against a seat seal (62) by a curved rear side (61), wherein the seat seal (62) is disposed in a sliding sleeve (24) which is spring-loaded in a sealing direction, wherein on its plug-in-side head surface (67), the sliding sleeve (24) carries a second seat seal (68) for interaction with a head surface (70) of the other, second coupling part (II) comprising a plug-in nipple (4).

29. Plug-in coupling according to claim 28, wherein the head surface (70) of the plug-in-nipple coupling part (II) is curved to match a correspondingly curved recess (71) of the valve body (2).

30. Plug-in coupling according to claim 28, wherein curved configuration of the head surface (70) is made up of a central ball portion (72) with an adjoining shallow truncated cone (73).

31. Plug-in coupling according to claim 28, wherein in a plugged-in position, the curved head surface (70) is located at a small spacing from the seat seal (68) of the sliding sleeve (24) associated with the head surface.

32. Plug-in coupling according to claim 28, wherein during its opening displacement, the valve body (2) pushes the head surface (70) back in relation to encircling front surface (74) of the plug-in nipple (4), with opening for throughflow of media being effected as a result of the valve body (2) moving into an opening (75) of the front surface (74) of the plug-in nipple (4).

33. Plug-in coupling according to claim 32, wherein the front surface (74) in sleeve-like housing (5) of the plug-in-nipple coupling part (II), following an unlocking operation (unlocking device 80), is displaceable beyond plug-in-side front wall (79) of the plug-in-nipple housing (5).

34. Plug-in coupling according to claim 33, wherein locking and unlocking takes place by means of an actuating ring (81) which is disposed on the sleeve-like housing (5/82) of the plug-in-nipple coupling part (II) in a rotatable manner and to the rear of an annular groove (21), into which blocking balls (17), controlled by the locking sleeve (9), enter.

35. Plug-in coupling according to claim 34, wherein curved head surface (70) is seated on a resiliently mounted load-bearing part (6) which is displaceable, with circumferential guidance, in the housing (5/82) of the plug-in-nipple coupling part (II).

36. Plug-in coupling according to claim 34, wherein a dummy stopper (97) which is associated with the plug-in-nipple coupling part (II) and has a sleeve wall (99) engaging thereover in a cup-like manner, a seat seal (100) of the dummy stopper (97) engaging against encircling front surface (74) and the dummy stopper being provided with retaining balls (101) which can be directed into the annular groove (21) of the housing (5/82) by screw-action displacement of cup sleeve wall (99) in relation to an inner sleeve (102).

37. Plug-in coupling according to claim 36, wherein the cup sleeve wall (99) and the inner sleeve (102) are provided with gripping ribs (106 and 107, respectively).

38. Plug-in coupling according to claim 34, further comprising a closure stopper (93) which is retained by the blocking balls (17), and blocks the locking sleeve (9) against further displacement in direction of locking position shortly before said locking sleeve reaches its securing end position.

39. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, further comprising a stop-limited clearance between a sliding sleeve (24) and a guiding housing (12) thereof in a region of a spring chamber (26), which is a constituent part of the two parts (12/24) and accommodates a prestressed sliding-sleeve spring (25).

40. Plug-in coupling according to claim 39, wherein in a supported position, the sliding-sleeve spring (25) is supported on an annular shoulder (28) of the housing (12), an annular shoulder (29) of the sliding sleeve (24) trailing in relation to the same, to provide a clearance.

41. Plug-in coupling according to claim 39, wherein directed away from coupling joint, the sliding sleeve (24) has a flexible corrugated-tube portion which interacts with an annular seal (27).

42. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein the other valve body (7) is displaceable both with tilting movement and also axially in the other coupling part (II).

43. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein the other valve body (7) is mounted by being supported by means of a helical spring (8), wherein the helical spring is a conical helical spring.

44. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein axis (y'—y') of the valve body (2), at the beginning of opening movement, moves into a tilted position which does not coincide with longitudinal center axis (y—y) of the coupling (K), said axes (y'—y', y—y) being coaxial at the end of the opening movement.

45. Plug-in coupling according to claim 44, wherein the valve body (7), when in aligned orientation with the longitudinal center axis (y—y) of the coupling (K), has a closure edge running perpendicularly to the longitudinal center axis (y—y).

46. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein a shaft (30) is secured beneath an end bushing (40) by a retaining ring (109), and the retaining ring (10) is secured by a securing bushing (110) engaging radially thereover.

47. Plug-in coupling according to claim 46, wherein the securing bushing (110) is secured on the shaft (30) by a split pin.

48. Plug-in coupling according to claim 46, further comprising a removable hand-lever grip (50) having a wrench head (114) which is connectable to a socket portion (116) for driving the shaft (30) in rotation.

49. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, and a connecting-rod bearing (33) having a plastics-material sliding element (112).

50. Plug-in coupling according to claim 49, wherein the sliding element (112) is of ring-like formation all around.

51. Plug-in coupling according to claim 49, wherein the sliding element (112) is provided in pairs.

52. Plug-in coupling according to claim 51, wherein the sliding elements (112) are formed from Teflon.

53. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, and having an other valve body (7), which is disposed in the other coupling part (II), wherein in the plugged-together position, said valve body (2) brings about primarily opening of the other valve body (7) at the periphery, wherein an annular seal (27) of a sliding sleeve (24) has an O-ring mounted upstream thereof facing the other coupling part.

54. Plug-in coupling according to claim 53, wherein the annular seal (27) is a U-ring with a U-opening in direction of the medium.

55. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein the external actuation takes place by means of a rotary actuation which is converted into a longitudinal displacement of the valve body (2), wherein rotary-actuation axis (x—x) has an eccentric (31) on which the valve body (2) is articulated via connecting-rod bearings (33), forming an anchoring point (34).

56. Plug-in coupling according to claim 55, wherein in a position in which it has been displaced in the opening direction, the valve body (2) is mounted pivotally about its anchoring point (34) on the rotary-actuation axis (x—x).

57. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein the external actuation takes place by means of a rotary actuation which is converted into a longitudinal displacement of the valve body (2), wherein rotary-actuation axis (x—x) carries a semicircularly-formed locking protrusion (42) which is located concentrically with the axis and with which a guide slot (43) of the locking sleeve (9) is associated, such that, in a release position of the locking sleeve (9), the semicircular profile of the locking protrusion (42) enters into the guide slot (43) with engagement on both sides and, in a release position of the locking sleeve (9), arcuate surface (44) of said semicircular profile, entering into a free space (48), moves into the guide slot (43) in front of a blocking flank (49), to a side of the guide slot.

58. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein the external actuation takes place by means of a rotary actuation which is converted into a longitudinal displacement of the valve body (2), wherein the locking sleeve (9) is secured against rotation.

59. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein the external actuation takes place by means of a rotary actuation which is converted into a longitudinal displacement of the valve body (2), wherein rotary-actuation axis (x—x) continues into a hand-lever grip (50), wherein the hand-lever grip (50) has a predetermined breaking point (51).

60. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein the external actuation takes place by means of a rotary actuation which is converted into a longitudinal displacement of the valve body (2), wherein rotary-actuation axis (x—x) continues into a hand-lever grip (50), wherein the hand-lever grip (50) is provided with a catch (52).

61. Plug-in coupling according to claim 60, wherein actuation path of the catch (52) is blockable via a lead-seal device.

62. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein a plug-in end of the valve body (2) is drawn against a seat seal (62) by way of a curved rear side (61), wherein the seat seal (62) is disposed in a sliding sleeve (24) which is spring-loaded in a sealing direction, wherein an annular seal (27) is associated with the sliding sleeve (24) which annular seal, being in positive engagement with the sliding sleeve (24) and the coupling-part housing (12), compensates for movement of the sliding sleeve (24) by itself deforming.

63. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein a plug-in end of the valve body (2) is drawn against a seat seal (62) by way of a curved rear side (61), wherein the seat seal (62) is disposed in a sliding sleeve (24) which is spring-loaded in a sealing direction, wherein on a plug-in-side head surface (67), the sliding sleeve (24) carries a second seat seal (68) for interaction with a head surface (70) of an other, second coupling part (II) comprising a plug-in nipple (4).

64. Plug-in coupling according to claim 63, wherein the head surface (70) of the plug-in-nipple coupling part (II) is curved to match a correspondingly curved recess (71) of the valve body (2).

65. Plug-in coupling according to claim 63, wherein curved configuration of the head surface (70) is made up of a central ball portion (72) with an adjoining shallow truncated cone (73).

66. Plug-in coupling according to claim 63, wherein in a plugged-in position, the curved head surface (70) is located at a small spacing from the seat seal (68) of the sliding sleeve (24) associated with the head surface.

67. Plug-in coupling according to claim 63, wherein during its opening displacement, the valve body (2) pushes the head surface (70) back in relation to encircling front surface (74) of the plug-in nipple (4), with opening for throughflow of media being effected as a result of the valve body (2) moving into an opening (75) of the front surface (74) of the plug-in nipple (4).

68. Plug-in coupling according to claim 67, wherein the front surface (74) in sleeve-like housing (5) of the plug-in-nipple coupling part (II), following an unlocking operation (unlocking device 80), is displaceable beyond plug-in-side front wall (79) of the plug-in-nipple housing (5).

69. Plug-in coupling according to claim 68, wherein locking and unlocking takes place by means of an actuating ring (81) which is disposed on the sleeve-like housing (5/82) of the plug-in-nipple coupling part (II) in a rotatable manner and to the rear of an annular groove (21), into which blocking balls (17), controlled by the locking sleeve (9), enter.

70. Plug-in coupling according to claim 69, wherein curved head surface (70) is seated on a resiliently mounted load-bearing part (6) which is displaceable, with circumferential guidance, in the housing (5/82) of the plug-in-nipple coupling part (II).

71. Plug-in coupling according to claim 69, wherein a dummy stopper (97) which is associated with the plug-in-nipple coupling part (II) and has a sleeve wall (99) engaging thereover in a cup-like manner, a seat seal (100) of the dummy stopper (97) engaging against encircling front surface (74) and the dummy stopper being provided with retaining balls (101) which can be directed into the annular groove (21) of the housing (5/82) by screw-action displacement of cup sleeve wall (99) in relation to an inner sleeve (102).

72. Plug-in coupling according to claim 71, wherein the cup sleeve wall (99) and the inner sleeve (102) are provided with gripping ribs (106 and 107, respectively).

73. Plug-in coupling according to claim 69, further comprising a closure stopper (93) which is retained by the blocking balls (17), and blocks the locking sleeve (9) against further displacement in direction of locking position shortly before said locking sleeve reaches its securing end position.

74. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, and a stop-limited clearance between a sliding sleeve (24) and a guiding housing (12) thereof in a region of a spring chamber (26), which is a constituent part of the two parts (12/24) and accommodates a prestressed sliding-sleeve spring (25).

75. Plug-in coupling according to claim 74, wherein in a supported position, the sliding-sleeve spring (25) is supported on an annular shoulder (28) of the housing (12), an annular shoulder (29) of the sliding sleeve (24) trailing in relation to the same, to provide a clearance.

76. Plug-in coupling according to claim 74, wherein directed away from coupling joint, the sliding sleeve (24) has a flexible corrugated-tube portion which interacts with an annular seal (27).

77. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein an other valve body (7) is displaceable both with tilting movement and also axially in the other coupling part (II).

78. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein an other valve body (7) is mounted by being supported by means of a helical spring (8), wherein the helical spring is a conical helical spring.

79. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein axis ($y'$—$y'$) of the valve body (2), at the beginning of opening movement, moves into a tilted position which does not coincide with longitudinal center axis ($y$—$y$) of the coupling (K), said axes ($y'$—$y'$, $y$—$y$) being coaxial at the end of the opening movement.

80. Plug-in coupling according to claim 79, further comprising another valve body (7) in another, second coupling part (II), and wherein the valve body (7), when in aligned orientation with the longitudinal center axis ($y$—$y$) of the coupling (K), has a closure edge running perpendicularly to the longitudinal center axis ($y$—$y$).

81. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein a shaft (30) is secured beneath an end bushing (40) by a retaining ring (109), and the retaining ring (10) is secured by a securing bushing (110) engaging radially thereover.

82. Plug-in coupling according to claim 81, wherein the securing bushing (110) is secured on the shaft (30) by a split pin.

83. Plug-in coupling according to claim 81, further comprising a removable hand-lever grip (50) having a wrench head (114) which is connectable to a socket portion (116) for driving the shaft (30) in rotation.

84. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, and a connecting-rod bearing (33) having a plastics-material sliding element (112).

85. Plug-in coupling according to claim 84, wherein the sliding element (112) is of ring-like formation all around.

86. Plug-in coupling according to claim 84, wherein the sliding element (112) is provided in pairs.

87. Plug-in coupling according to claim 86, wherein the sliding elements (112) are formed from Teflon.

88. Plug-in coupling (K) for connecting pipelines or tubes, having a valve body (2) which is disposed in one of two coupling parts (I, II) and is actuatable from the outside, and having a locking sleeve (9) which is displaceable from a locking position, in which a plugged-together position of the two coupling parts (I, II) is secured by spring loading, into a release position, wherein external actuation of the valve body (2) in a release position of the locking sleeve (9), which is retained there despite the spring loading, and displacement of said locking sleeve into the release position in an open position of the valve body (2), are blocked, wherein an annular seal (27) of a sliding sleeve (24) has an O-ring mounted upstream thereof on coupling-joint side.

89. Plug-in coupling according to claim 88, wherein the annular seal (27) is a U-ring with a U-opening in direction of the medium.

* * * * *